US011054824B2

(12) United States Patent
Oba

(10) Patent No.: US 11,054,824 B2
(45) Date of Patent: Jul. 6, 2021

(54) AUTOMATIC DRIVING CONTROL DEVICE AND AUTOMATIC DRIVING CONTROL METHOD, AND PROGRAM

(71) Applicant: SONY CORPORATION, Tokyo (JP)

(72) Inventor: Eiji Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 134 days.

(21) Appl. No.: 16/416,748

(22) Filed: May 20, 2019

(65) Prior Publication Data

US 2019/0271981 A1 Sep. 5, 2019

Related U.S. Application Data

(63) Continuation of application No. 15/527,728, filed as application No. PCT/JP2015/006042 on Dec. 4, 2015, now Pat. No. 10,331,127.

(30) Foreign Application Priority Data

Dec. 12, 2014 (JP) .................................. 2014-251493

(51) Int. Cl.
*G05D 1/00* (2006.01)
*B60W 50/08* (2020.01)
(Continued)

(52) U.S. Cl.
CPC ......... *G05D 1/0061* (2013.01); *B60K 28/066* (2013.01); *B60W 30/182* (2013.01);
(Continued)

(58) Field of Classification Search
CPC ................... G05D 1/00; G05D 1/0061; G05D 2201/0213; B60W 30/00; B60W 30/182;
(Continued)

(56) References Cited

U.S. PATENT DOCUMENTS 6,091,334 A 7/2000 Galiana et al.
7,380,938 B2 6/2008 Chmielewski, Jr. et al.
(Continued)

FOREIGN PATENT DOCUMENTS

DE 10 2011 101 709 A1 11/2012
DE 10 2012 016 802 A1 2/2014
(Continued)

OTHER PUBLICATIONS

Notification of Reason for Refusal issued in Japanese Application 2015-242369 dated Oct. 24, 2019.
(Continued)

*Primary Examiner* — Yonel Beaulieu
(74) *Attorney, Agent, or Firm* — Xsensus LLP

(57) ABSTRACT

A method for switching modes for operating a vehicle, a non-transitory computer-readable medium for performing the method, and information processing apparatuses. The method includes determining, by circuitry of an information processing apparatus, whether a mode for operating the vehicle is to be switched from one of autonomous and manual driving modes to the other of the autonomous and manual driving modes. A state of a driver of the vehicle is obtained when the mode for operating the vehicle is determined to be switched. The method further includes switching, by the circuitry, the mode for operating the vehicle from the one of the autonomous and manual driving modes to the other of the autonomous manual driving modes based on the obtained state of the driver.

19 Claims, 24 Drawing Sheets

(51) Int. Cl.
*B60W 50/14* (2020.01)
*B60K 28/06* (2006.01)
*B60W 30/182* (2020.01)

(52) U.S. Cl.
CPC .......... *B60W 50/08* (2013.01); *B60W 50/082* (2013.01); *B60W 50/14* (2013.01); *B60W 2540/18* (2013.01); *B60W 2540/22* (2013.01); *B60W 2540/26* (2013.01); *B60W 2555/60* (2020.02); *B60W 2720/10* (2013.01); *G05D 2201/0213* (2013.01)

(58) Field of Classification Search
CPC .... B60W 50/00; B60W 50/08; B60W 50/082; B60W 50/14; B60W 2555/60; B60W 2540/18; B60W 2540/22; B60W 2540/26; B60W 220/00; B60W 220/10; B60W 2720/10; B60W 40/08; B60W 2050/143; B60W 2050/146; B60K 28/00; B60K 28/06; B60K 28/066

See application file for complete search history.

(56) References Cited

U.S. PATENT DOCUMENTS

| | | | |
|---|---|---|---|
| 9,180,789 | B2 | 11/2015 | Higashitani et al. |
| 10,328,941 | B2* | 6/2019 | Fujii ............... B60W 30/18163 |
| 10,331,127 | B2* | 6/2019 | Oba .................... B60W 30/182 |
| 10,509,400 | B2* | 12/2019 | Sato ..................... G05D 1/0061 |
| 10,671,071 | B2* | 6/2020 | Jang ....................... B60W 30/14 |
| 10,762,362 | B2* | 9/2020 | Chiba .................... B60W 30/14 |
| 2014/0156133 | A1 | 6/2014 | Cullinane et al. |
| 2014/0156134 | A1 | 6/2014 | Cullinane et al. |
| 2014/0277878 | A1 | 9/2014 | Manickaraj et al. |
| 2014/0330478 | A1 | 11/2014 | Cullinane et al. |
| 2015/0217763 | A1 | 8/2015 | Reichel et al. |
| 2015/0284009 | A1 | 10/2015 | Cullinane et al. |
| 2016/0033478 | A1 | 2/2016 | Nishimori et al. |
| 2016/0129831 | A1* | 5/2016 | Liotti .................. B62D 15/021 701/41 |
| 2016/0179092 | A1 | 6/2016 | Park |
| 2018/0203451 | A1 | 7/2018 | Cronin et al. |

FOREIGN PATENT DOCUMENTS

| | | |
|---|---|---|
| DE | 10 2012 213 965 A1 | 2/2014 |
| EP | 2 314 489 A1 | 4/2011 |
| EP | 2 314 490 A1 | 4/2011 |
| JP | 2000-329852 A | 11/2000 |
| JP | 2002-163799 A | 6/2002 |
| JP | 2005-510783 A | 4/2005 |
| JP | 2007-531090 A | 11/2007 |
| JP | 2011-015913 A | 1/2011 |
| JP | 2011-051402 A | 3/2011 |
| JP | 2012-030696 A | 2/2012 |
| JP | 2014-107854 A | 6/2014 |
| JP | 2015-017944 A | 1/2015 |
| JP | 2016-504232 A | 2/2016 |
| WO | 2014/073079 A1 | 5/2014 |
| WO | 2014/085380 A1 | 6/2014 |

OTHER PUBLICATIONS

International Search Report dated Mar. 9, 2016 in PCT/JP2015/006042 filed Dec. 4, 2015.

Office Action dated May 19, 2020 in Japanese Patent Application No. 2015-242369, 9 pages.

* cited by examiner

FIG. 17 t=001:  ○ ○ ◍         ◍ ○ ○ t=002:  ○ ◍ ○         ○ ◍ ○ t=003:  ◍ ○ ○         ○ ○ ◍ t=004:  ○ ○ ◍         ◍ ○ ○ t=005:  ○ ◍ ○         ○ ◍ ○ t=006:  ◍ ○ ○         ○ ○ ◍

AUTOMATIC DRIVING CONTROL DEVICE AND AUTOMATIC DRIVING CONTROL METHOD, AND PROGRAM

CROSS-REFERENCE TO RELATED APPLICATIONS

This application is a continuation of U.S. Pat. No. 10,331,127, filed May 18, 2017, which is the National Stage of International Application No. PCT/JP2015/006042, filed Dec. 4, 2015.

DESCRIPTION

Technical Field

The present disclosure relates to an automatic driving control device, an automatic driving control method, and a program, and more particularly, relates to an automatic driving control device, an automatic driving control method, and a program capable of safely performing automatic driving.

CROSS REFERENCE TO RELATED APPLICATIONS

This application claims the benefit of Japanese Priority Patent Application JP 2014-251493 filed on Dec. 12, 2014, the entire contents of which are incorporated herein by reference.

Background Art

In recent years, rapid progress has been made in a technical development for realizing automatic driving of an automobile. For example, a lane departure warning system that emits warning when a cruising vehicle moves out of a lane has been developed recently as a technical development related to automatic driving. When, in a monotonous road, there is a decrease in the level of driver's awakening, and the cruising vehicle begins to move out of the lane, the lane departure warning system emits warning with vibration, sound, and the like. It is recognized that such lane departure warning system has the effect of preventing lane departure accident of vehicles in advance, and when the effect is considered in terms of statistics, it is recognized that the lane departure warning system greatly reduces the lane departure accident of a vehicle group having the lane departure warning system provided.

A technique for detecting obstacles with a submillimeter wave radar using a submillimeter wave, LIDAR (Light Detection and Ranging) using laser instead of a submillimeter wave, or a stereo camera has been developed as a technique for sensing around a vehicle to measure a distance between and arrangement of the vehicle and a vehicle driving ahead (see PTL 1). Therefore, applications such as an adaptive cruise control system for maintaining the distance between the vehicle and a vehicle driving ahead and further an emergency collision reduction/prevention brake system have been put into practice as applications.

When automatic driving is used, the degree of proficiency in driving is different depending on the driver, and it is considered that it is very important to monitor the status of the driver.

However, a system in which a passenger does not at all intervene in driving of a vehicle from the departure location to the destination location is viable only in a closed environment such as a vehicle running on a track such as an electric train and a monorail, but in the system that can be conceived today, introduction of the automatic driving of vehicles has not been realized on a generally-used road surface for the time being.

On the other hand, introduction of automatic driving is beginning to start in some way. At that occasion, a manual intervention travelling section is expected to occur. At that occasion, when the vehicle once goes into an automatic driving mode and shuts off intervention into the driver's driving, a lower level of manual driving recovery ability at that occasion of recovery is considered to be a risk of causing an accident and disturbing traffic.

For example, unlike drink and driving, even if the driver gets a little bit fatigued, transportation on a vehicle is considered to cause a mental effect on a person who wishes to move to actively drive the vehicle, and it is desired to have a mechanical or systematic mechanism for reducing an operation involving danger as an automatic driving system.

CITATION LIST

Patent Literature

[PTL 1]
JP 2000-329852 A

SUMMARY OF INVENTION

Technical Problem

From the perspective of operation as described above, in order to more safely perform automatic driving, the driver needs to have a driving recovery ability when the driver plans to run in a manual driving section before the start of automatic cruising associated with driving of automatic driving, and it is necessary to have a mechanism to allow dedicated automatic driving cruising upon determining whether the driver has the driving recovery ability or not. In addition, it is necessary to have a measure to prohibit the start of running of automatic driving in a state where it is confirmed that the performance to recover back into a manual driving section is determined to have become lower level.

The present disclosure is made in view of such circumstances, and the present disclosure is to enable safer automatic driving.

Solution to Problem

In an embodiment of the present disclosure, there is provided a method for switching modes for operating a vehicle. The method includes determining, by circuitry of an information processing apparatus, whether a mode for operating the vehicle is to be switched from one of autonomous and manual driving modes to the other of the autonomous and manual driving modes. The method includes obtaining a state of a driver of the vehicle when the mode for operating the vehicle is determined to be switched. The method further includes switching, by the circuitry, the mode for operating the vehicle from the one of the autonomous and manual driving modes to the other of the autonomous manual driving modes based on the obtained state of the driver.

In another embodiment of the present disclosure, there is provided a non-transitory computer-readable medium storing instructions which, when executed by a computer, causes the computer to perform a method for switching modes for operating a vehicle. The method includes determining whether a mode for operating the vehicle is to be switched from one of autonomous and manual driving modes to the other of the autonomous and manual driving modes. The method includes obtaining a state of a driver of the vehicle when the mode for operating the vehicle is determined to be switched. The method further includes switching the mode for operating the vehicle from the one of the autonomous and manual driving modes to the other of the autonomous manual driving modes based on the obtained state of the driver.

In another embodiment of the present disclosure, there is provided an information processing apparatus, including circuitry configured to determine whether a mode for operating a vehicle is to be switched from one of autonomous and manual driving modes to the other of the autonomous and manual driving modes. The circuitry is configured to obtain a state of a driver of the vehicle when the mode for operating the vehicle is determined to be switched. The circuitry is further configured to switch the mode for operating the vehicle from the one of the autonomous and manual driving modes to the other of the autonomous manual driving modes based on the obtained state of the driver.

In another embodiment of the present disclosure, there is provided an information processing apparatus, including means for determining whether a mode for operating a vehicle is to be switched from one of autonomous and manual driving modes to the other of the autonomous and manual driving modes, means for obtaining a state of a driver of the vehicle when the mode for operating the vehicle is determined to be switched, and means for switching the mode for operating the vehicle from the one of the autonomous and manual driving modes to the other of the autonomous manual driving modes based on the obtained state of the driver.

Advantageous Effects of Invention

According to an aspect of the present disclosure, automatic driving can be performed more safely.

BRIEF DESCRIPTION OF DRAWINGS

FIG. 17 is a figure for explaining flashing of a hazard flasher.

DESCRIPTION OF EMBODIMENTS

Hereinafter, a specific embodiment to which the present technique is applied will be explained in details with reference to drawings.

Figure 1:
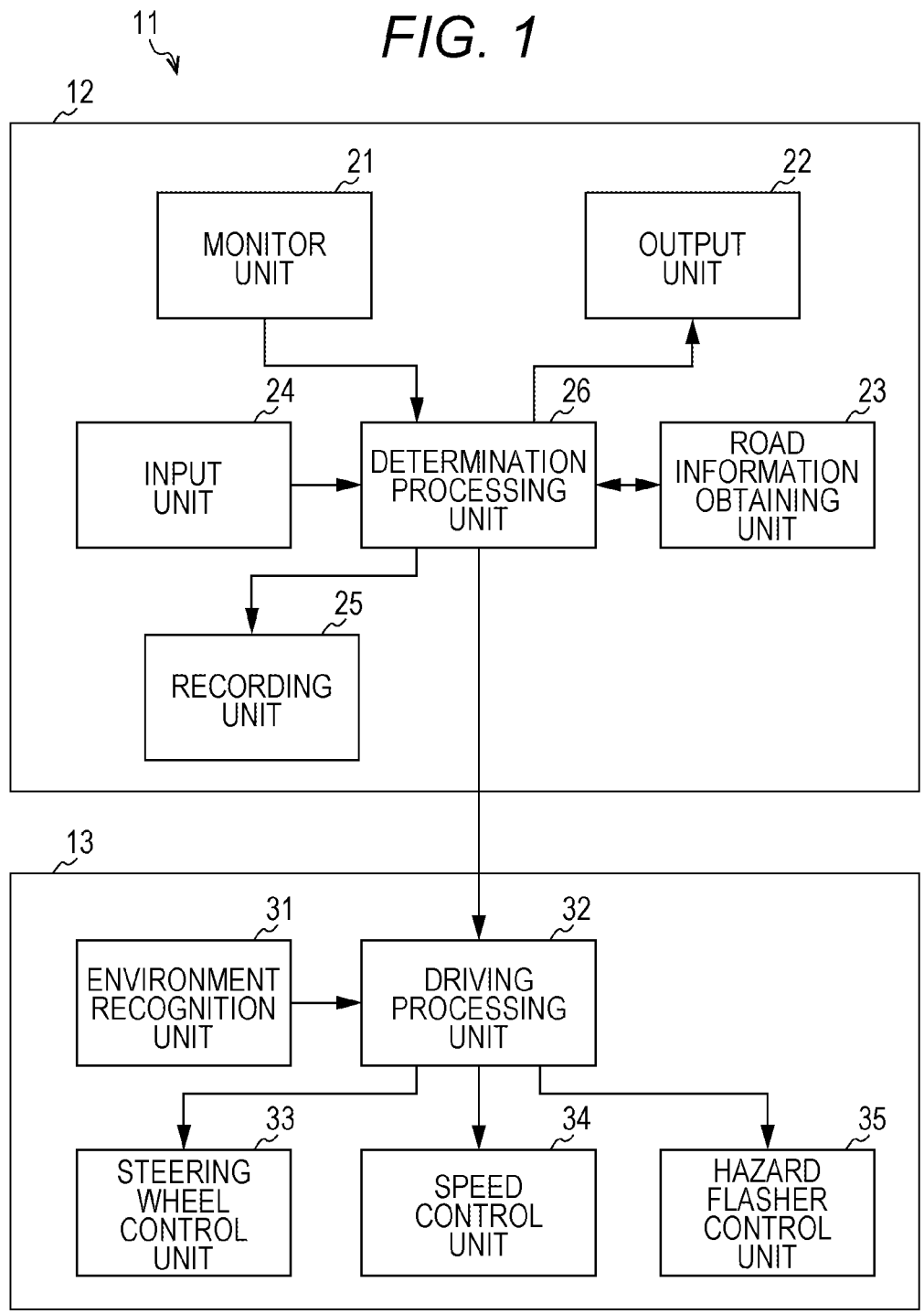
FIG. 1 is a block diagram illustrating an example of configuration of an embodiment of an automatic driving control device to which the present technique is applied.

FIG. 1 is a block diagram illustrating an example of configuration of an embodiment of an automatic driving control device to which the present technique is applied.

An automatic driving control device 11 as shown in FIG. 1 is incorporated as a part of an automatic driving system provided in an automobile capable of performing automatic driving, and is configured to include a recovery determination unit 12 and a driving execution unit 13. For example, the automatic driving control device 11 performs control when an automobile that performs automatic driving changes from manual driving to automatic driving, or when it is difficult to continue continuous automatic driving due to certain dependency on the vehicle itself or the environment during automatic driving, or when the automobile recovers back to manual driving performed by a driver.

The recovery determination unit 12 determines whether the driver has a sufficient level of driving ability to recover from automatic driving back to manual driving. As shown in the drawing, the recovery determination unit 12 is configured to include a monitor unit 21, an output unit 22, a road information obtaining unit 23, an input unit 24, a recording unit 25, and a determination processing unit 26. It should be noted that the manual driving operation according to an embodiment of the present disclosure is not limited to driving operation using a manual transmission, and the manual driving operation according to an embodiment of the present disclosure generally means driving operation in which the driver intervenes in driving operation of the vehicle in some way to directly cause effect on the driving of the vehicle.

The monitor unit 21 continuously monitors the state of the driver to find the awakened state of the driver, and provides the driver status indicating the awakened state of the driver to the determination processing unit 26. For example, as explained later with reference to FIG. 8, the monitor unit 21 recognizes the vision line direction of the driver, thus obtaining the driver status indicating whether the driver is in a awakened state in which the driver can drive normally. In addition, the monitor unit 21 can monitor the state of the driver according to various methods such as, for example, recognizing the posture of the face of the driver, detecting the cardiac state of the driver, tracking the steering stability of the steering, detecting the body order of the driver, detecting a change in the degree of fatigue/a cardiac rate of the driver, and the operation stability of the brake and acceleration pedals. The monitor unit 21 can monitor the driving ability of the driver by using one or more methods including face recognition of the driver, head part posture recognition, vision line direction recognition, and statistical determination processing of the head part posture or the vision line direction time lapse stability. Further, the monitor unit 21 can monitor whether there is a malfunction in the vehicle, and monitor whether the vehicle is in an emergency state or not. In addition, information about the planned driving route is derived in a timely manner from the infrastructure side of the monitor unit 21 and vehicles around the vehicle in question, and a route in which the vehicle drives may be monitored in advance by monitoring the trafficable situation of the road and the like. It should be noted that, while the monitor unit 21 continuously monitors the state of the driver, the monitor unit 21 may temporarily interrupt direct monitoring of the driver in a driving section where autonomous automatic driving is guaranteed in which the intervention of the driver is not at all necessary.

For example, the output unit 22 is connected to a speaker, not shown, and outputs various kinds of announces and warning sounds with the speaker in accordance with an instruction provided on the basis of a result obtained when the determination processing unit 26 performs determination processing.

The road information obtaining unit 23 obtains road information around the running vehicle, for example, road information about an ordinary road, a completely automatic driving-only lane, and a buffer zone road in accordance with the driving route of the vehicle and notifies the road information to the determination processing unit 26.

The input unit 24 receives, e.g., the driving route from, for example, a setting device with which the driver sets the driving route at the start of the automatic driving, and receives a self-diagnosis result related to automatic driving of the vehicle from a diagnosis device for diagnosing the situation of each unit of the vehicle. The input unit 24 provides the thus received information to the determination processing unit 26.

The recording unit 25 records various kinds of processing performed by the automatic driving control device 11. For example, the recording unit 25 records and saves some or all of determination results and the like made by the determination processing unit 26. In particular, e.g., in switching of a driving mode related to a decision making by the driver explained later, the recording made by the driver himself/herself is at least saved as non-erasable recording.

The determination processing unit 26 performs various kinds of determination processing on the basis of the driver status provided by the monitor unit 21, the driving route and self-diagnosis result provided from the input unit 24, the road information provided from the road information obtaining unit 23.

The driving execution unit 13 executes automatic driving cruising of the vehicle. As shown in the drawing, the driving execution unit 13 is configured to include an environment recognition unit 31, a driving processing unit 32, a steering wheel control unit 33, a speed control unit 34, and a hazard flasher control unit 35.

The environment recognition unit 31 uses, for example, devices such as a stereo camera and a laser radar to recognize external environment of the vehicle, and provides information indicating the external environment to the driving processing unit 32.

When the driving processing unit 32 receives an emergency stop command for making an emergency stop of the vehicle from the determination processing unit 26 of the recovery determination unit 12 that makes a possibility/impossibility determination as to whether the driving mode can be changed from automatic driving to manual driving, the driving processing unit 32 gives instructions to the steering wheel control unit 33, the speed control unit 34, and the hazard flasher control unit 35, and performs driving processing to make an emergency stop of the vehicle.

The steering wheel control unit 33 performs control of steering of the vehicle for determining the direction in accordance with an instruction given by the driving processing unit 32 by centrally performing acknowledgement processing on road running detailed lane information about the planned driving route on which the vehicle drives on the basis of the planned route map and which is obtained from the environment recognition unit 31, correlated ambient obstruction information correlated to the lane in question, and the like. The speed control unit 34 performs brake and acceleration control for controlling the speed of the vehicle in accordance with an instruction given by the driving processing unit 32. The hazard flasher control unit 35 performs control of lighting of a hazard flasher (emergency flashing indication lamp) provided in the vehicle in accordance with an instruction given by the driving processing unit 32. Although the steering wheel control unit 33 is referred to as a steering wheel control unit, the steering wheel control also includes turning control of the vehicle that is achieved by individually controlling the wheels with an electronic control brake, because this is not the content that is directly related to the present disclosure.

In the automatic driving control device 11 configured as described above, the determination processing unit 26 can determine whether the driver has a sufficient level of driving ability for recovering back to the manual driving on the basis of the driver status provided from the monitor unit 21. Then, the determination processing unit 26 can permit switching to the automatic driving mode in accordance with this determination result.

For example, the monitor unit 21 provides the determination processing unit 26 with the driver status including a consciousness state, a psychological state, a stress state, a drug affection degree, and the like of the driver made into parameters. Then, the determination processing unit 26 makes a threshold value determination of these parameters, thus determining whether the driver has a sufficient level of driving ability for recovering back to the manual driving, and can permit switching to the automatic driving mode.

In a case where an alcohol detection sensor is connected to the monitor unit 21, the monitor unit 21 detects the alcohol intake level of the driver on the basis of the alcohol concentration detected from the breath of the driver, and provides the alcohol intake level to the determination processing unit 26 as the driver status. Therefore, when switching to the automatic driving mode, the determination processing unit 26 can determine whether the driver has a sufficient level of driving ability to recover back to the manual driving or not on the basis of the alcohol intake level of the driver.

Further, when switching to the automatic driving mode, the determination processing unit 26 uses the determination result based on the alcohol intake level of the driver, and observes the elapse of the transition of the consciousness degree of the driver, and in a case where there is an increase in the delay of the decision made by the driver, the driving assistance is terminated, and the vehicle is caused to forcibly evacuate to an evacuation lane and the like soon, so that the vehicle can be proceed to an action for stopping. In particular, when the vehicle that started to drive along the planned route enters into an automatic driving section from a manual driving section, the driver's driving recovery ability determination is made in a previous buffer section R2 of FIG. 3 explained later, and in a case where a driving recovery ability is not expected, an evacuation control is performed to cause the vehicle to drive into an emergency temporary evacuation lane.

Subsequently, automatic driving termination processing that is performed when the automatic driving is terminated will be explained with reference to a flowchart of FIG. 2.

For example, when the determination processing unit 26 recognizes that the current driving point is before the end of the completely automatic driving-only lane on the basis of the infrastructure, the vehicle-mounted drive history, the position information, and the like, processing for manual driving possibility/impossibility determination of the driver of the vehicle is started. For example, when the vehicle enters into a buffer zone road (road environment R7) provided immediately before the end of the completely automatic driving-only lane of FIG. 3 explained later, this determination processing is started.

In step S11, the determination processing unit 26 controls the output unit 22 to output a sound announce indicating that the automatic driving travel track is coming to the end. Accordingly, the output unit 22 uses a speaker, not shown, to output, for example, a sound announce "automatic driving is going to be terminated", or a corresponding particular alarm sound. Alternatively, the end of the automatic driving travel track may be notified by vibrating the steering or the seat, or giving a haptic feedback such as pulling the seat belt.

In step S12, the determination processing unit 26 obtains, from the monitor unit 21, the driver status for determining whether the driver has a level of driving ability to be able to recover back to the manual driving. For example, the monitor unit 21 continuously monitors the driver before the automatic driving termination processing is started, and provides the monitor result of the driver in a predetermined period before the automatic driving termination processing is started to the determination processing unit 26 as the driver status.

Figure 3:
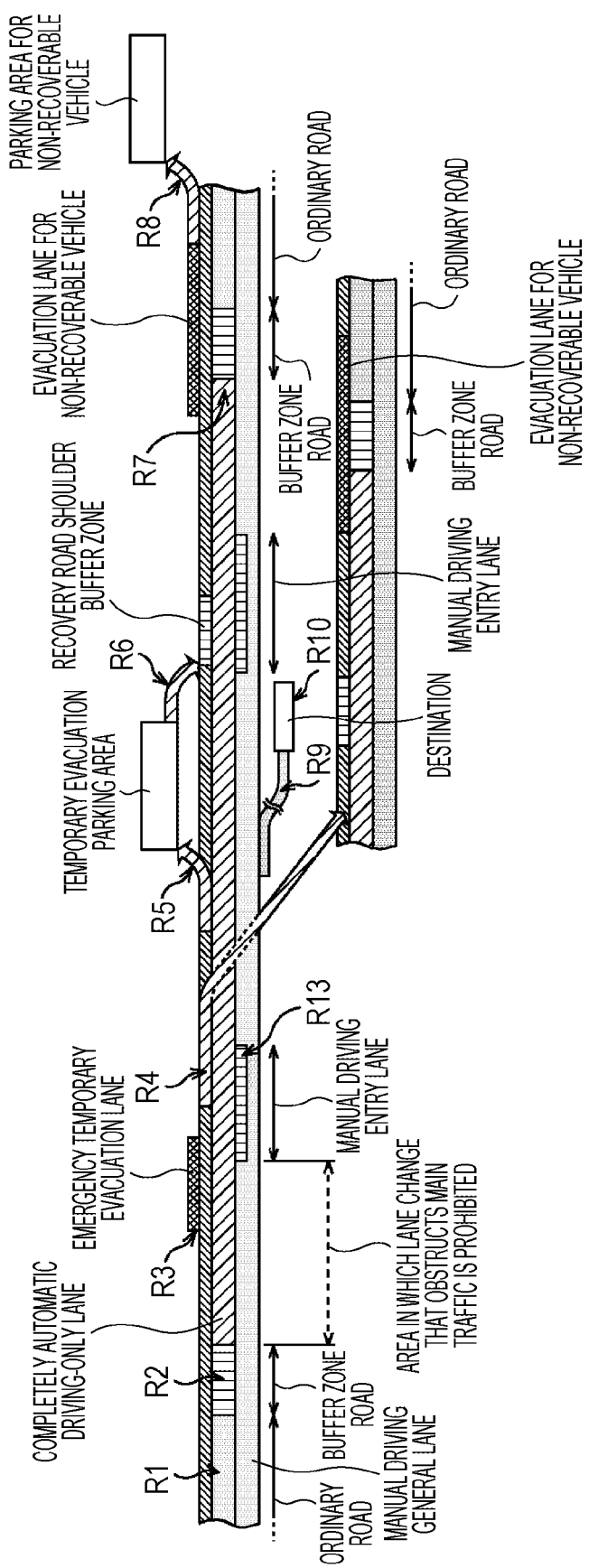
FIG. 3 is a figure for explaining road environments related to automatic driving and processing that is performed in each road environment.

Alternatively, before the vehicle enters into the section of the road environment R7 of FIG. 3, a notification input may be given to the driver in accordance with any one of the auditory, visual, tactile methods and the like, and a confirmation may be made by a method for confirming that the driver gives an appropriate feedback to the determination processing unit 26 of the vehicle in response to the instruction. The appropriate feedback means that even if the driver is in a consciousness state in a course of awakening from sleeping, and more specifically, even if the environment judgement performance is an insufficient level of awakening, the driver is prevented from, or is less likely to cancel the automatic driving in a hurry without thinking, by introducing, e.g., a push procedure of buttons that are changed on every occasion in accordance with a guidance of two different buttons that is performed through a determination procedure in a more thinking manner rather than an operation for pushing a simple button that can be operated by a reflective operation.

In step S13, the determination processing unit 26 makes a determination as to whether the driver has a sufficient level of driving ability to recover back to the manual driving or not on the basis of the driver status obtained in step S12.

In step S13, in a case where the determination processing unit 26 determines that the driver does not have a sufficient level of driving ability to be able to recover back to the manual driving, and more specifically, in a case where the determination processing unit 26 determines that the driver's driving ability is insufficient, the processing in step S14 is subsequently performed.

In step S14, the determination processing unit 26 controls the output unit 22 to give a warning to the driver to perform safe consciousness recovery. Accordingly, the output unit 22 uses a speaker and the like to output a sound announce, a warning sound, and the like to prompt the driver to perform the consciousness recovery. For example, in a case where a device, a display device, and the like for giving warning to the driver in a tactile manner in accordance with a haptic technique of a force feedback and the like are connected to the output unit 22, the output unit 22 can prompt the driver to perform the consciousness recovery by outputting a tactile notice and a visual warning.

In step S15 after the processing in step S14, the determination processing unit 26 performs re-determination of the driver's driving ability like step S13.

In a case where the determination processing unit 26 determines that the driver's driving ability is insufficient in step S15, the processing in step S16 is subsequently performed. In step S16, the determination processing unit 26 instructs the driving processing unit 32 of the driving execution unit 13 to enter into the evacuation lane in accordance with a road sign and stop the vehicle. Accordingly, the driving processing unit 32 controls the steering wheel control unit 33 and the speed control unit 34 on the basis of the information indicating the external environment provided from the environment recognition unit 31, and performs automatic driving in which the vehicle stops after the vehicle enters into the evacuation lane. Then, after the stopping of the vehicle is completed in the evacuation lane, the automatic driving termination processing is terminated.

On the other hand, in a case where the determination processing unit 26 determines that the driver's driving ability is sufficient (the driver's driving ability is sufficiently maintained or recovered) in step S13 or S15, the processing in step S17 is subsequently performed.

In step S17, the determination processing unit 26 notifies the driving processing unit 32 that the driving processing unit 32 of the driving execution unit 13 is permitted to switch to the manual driving. Accordingly, the driving processing unit 32 prepares switching from the automatic driving to the manual driving.

Thereafter, for example, when the driver operates the steering wheel or acceleration, the driving processing unit 32 switches the driving of the vehicle from the automatic driving to the manual driving in step S18. Then, the manual driving by the driver is started, and the driving proceeds to the ordinary road, and the manual driving is performed continuously, and then, the automatic driving termination processing is terminated. In the transition to the manual driving performed here, it is not typically necessary to include an explicit operation as long as the steering of the driver is stable, and the transition to the manual driving may be performed seamlessly.

With the automatic driving control device 11, the output unit 22 may output a sound announce for notifying the end of the completely automatic driving-only lane to give a notice to the passengers in the vehicle, before the vehicle enters into a buffer zone road provided immediately before the end of the completely automatic driving-only lane. Thereafter, in a case where the driver's driving ability is determined to be insufficient, the determination processing unit 26 can control the output unit 22 to activate a device to cause the driver to obtain awakening in accordance with a haptic technique such as a force feedback explained above. In a case where the driver's driving ability is insufficient even after that, the determination processing unit 26 can control the driving processing unit 32 to cause the vehicle to evacuate into an evacuation lane and suddenly slows down within a safe range for a vehicle driving behind in accordance with automatic driving.

In this case, for example, the meaning of suddenly slowing down the vehicle on purpose is that the manual driving recovery of the driver is a flow of operation that is originally desired, and when multiple vehicles continuously, repeatedly make an evacuation retraction stop in succession from the perspective of road environment maintenance, a certain number of vehicles or more may not be accommodated, which is not desirable. More specifically, the vehicle controller does not prefer stopping of the vehicle by using sudden deceleration which is not a comfortable riding, and therefore, it is expected to comfortably recover back to the manual driving by seamlessly proceeding to the manual driving in advance.

In a case where the automatic driving control device 11 is provided with an emergency automatic stop operation unit that can be easily operated by a non-driver, the driving processing unit 32 may be configured to start an emergency stop sequence when an operation is performed with the emergency automatic stop operation unit.

Further, with the automatic driving control device 11, when proceeding from the automatic driving mode to the manual driving mode, the output unit 22 can perform control to repeat non-regular switching of illuminations of the rear portion of the vehicle. At this occasion, the output unit 22 performs control to successively, continuously turn on lamps from the center of the vehicle to the outside, so that it can be visually acknowledged in an approaching and enlarging manner when it is seen from the vehicle driving behind. More specifically, when seen from the vehicle driving behind, the driver of the vehicle driving behind feels an illusion feeling as if the lamp interval is expanding, and therefore, a situation can be produced to feel as if approaching the vehicle in terms of feeling, and the driver of the vehicle driving behind receives a feeling that the vehicle is approaching as a perception feeling in a psychological manner, and therefore, the driver of the vehicle driving behind naturally sees as if the vehicle driving ahead decelerates, and thus a notice can be given.

Subsequently, road environments related to automatic driving and processing performed for each road environment will be explained with reference to FIG. 3.

The road environment R1 is an ordinary road before entering into a completely automatic driving-only lane. In a case where the vehicle starts with manual driving of the driver, and enters into the completely automatic driving-only lane in the route, a determination processing is made in the road environment R1 to determine whether the driver has a recovery ability to recover from the completely automatic driving in the driving ahead. In a case where the completely automatic driving is performed from the start point, a determination processing as to whether the driver has a recovery ability to recover from the completely automatic driving is made immediately after the route is set at the start of the automatic driving.

The road environment R2 is a buffer zone road before entering from the ordinary road into the completely automatic driving-only lane. In this buffer zone road, in a case where the driver is determined to have performance of recovery as a result of determination performed before, the vehicle is basically considered to enter into the completely automatic driving-only lane, and various kinds of notice announces (the road route guidance to the destination location, road surface, weather, rest stop, accident occurrence situation, and the like) are given. At this occasion, automatic cruising is prepared, and driver non-intervention complete autonomous automatic cruising mode or attention continuation driver occasional succession mode is set as the allowed driving mode. Further, in the buffer zone road, a termination notice of the end of the ordinary road, a notice to passengers, and an announcement of traffic jam information are given. In addition, a preparation setting of not-experienced section driving mode, emergency early warning mode activation, and the like is made, and a prompt for reconfirmation is given.

On the other hand, in a case where the driver is determined not to have the performance for recovery as a result of the determination processing performed before the buffer zone road, the driver is prompted to select any one of an evacuation rest and a completely automatic driving-only lane driving in emergency state.

The road environment R3 is an emergency temporary evacuation lane provided at roadside for each section on the route of the completely automatic driving-only lane. For example, the emergency temporary evacuation lane is used when the vehicle evacuates due to decrease in a level of driving ability for recovering from the completely automatic driving to the manual driving, or when emergency evacuation is necessary due to a system failure. In FIG. 3, a single road environment R3 is drawn due to restrictions of the drawing, but, for example, the road environments R3 are considered to be provided every several kilometers.

The road environment R4 is a transition completely automatic driving exit-only lane between main highway roads. In the transition completely automatic driving exit-only lane of the main highway road, guidance is given to the driver as necessary, and a guidance is given with the temporary awakening recovery to the driver, so that a help can be provided to find the instantaneous situation of the emergency.

The road environment R5 is an entrance lane for entering into a parking area for temporary evacuation. This parking area is preferably a rest stop into which a vehicle can enter with completely automatic driving under a situation in which the driver needs to rest because of accumulated fatigue although it is not emergency, or is preferably facilities corresponding to the rest stop.

The road environment R6 is a recovery lane for recovering from the parking area for temporary evacuation back to the completely automatic driving-only lane, and the recovery ability is confirmed, e.g., a necessary notice announce for driving recovery.

The road environment R7 is a buffer zone road before entering into an ordinary road from the completely automatic driving-only lane. This buffer zone road lane serves as a driving section for determining an evacuation lane guidance possibility/impossibility for the vehicle in which the driver is determined not to have driving recovery ability in the completely automatic driving-only lane termination, and in a case where it is determined to be difficult or it is determined to be dangerous to perform seamless manual driving continuous cruising of the driving as a result of the determination, an automatic guidance to the evacuation lane is provided, and in order to avoid completely clogging the area because of continuous evacuation although the evacuation lane is used as a pool lane for a short period of time, the space for vehicles driving behind can be ensured by automatically parking and stopping by way of the guidance path R8 to the evacuation parking area after the vehicle basically slows down and enters.

In the road environment R9, the vehicle shifts from the completely automatic driving-only lane to the manual driving general lane, and it is connected to a manual driving general lane and the vehicle reaches the destination location (road environment R10).

The road environment R13 is a manual driving entry lane which is a section in which the vehicle departs from the completely automatic driving-only lane to the manual driving general lane.

In the manual driving general lane which is a road provided at the side of the completely automatic driving-only lane, areas other than the manual driving entry lane (road environment R13) is an area in which a lane change that obstructs the main traffic is basically prohibited. Therefore, this area is a driving range in which an entry into the manual driving general lane is not so much expected.

The manual driving entry lane is an area in which an entry into the manual driving general lane is expected when a direction indicator lamp is manually operated, and in the manual driving entry lane, it is an obligation for an ordinary vehicle to allow entry in a preferential manner. For example, the manual driving entry lane is used to prepare for, e.g., move on to a road that does not have any completely automatic driving-only lane at a branch ahead of the manual driving entry lane.

Figure 4:
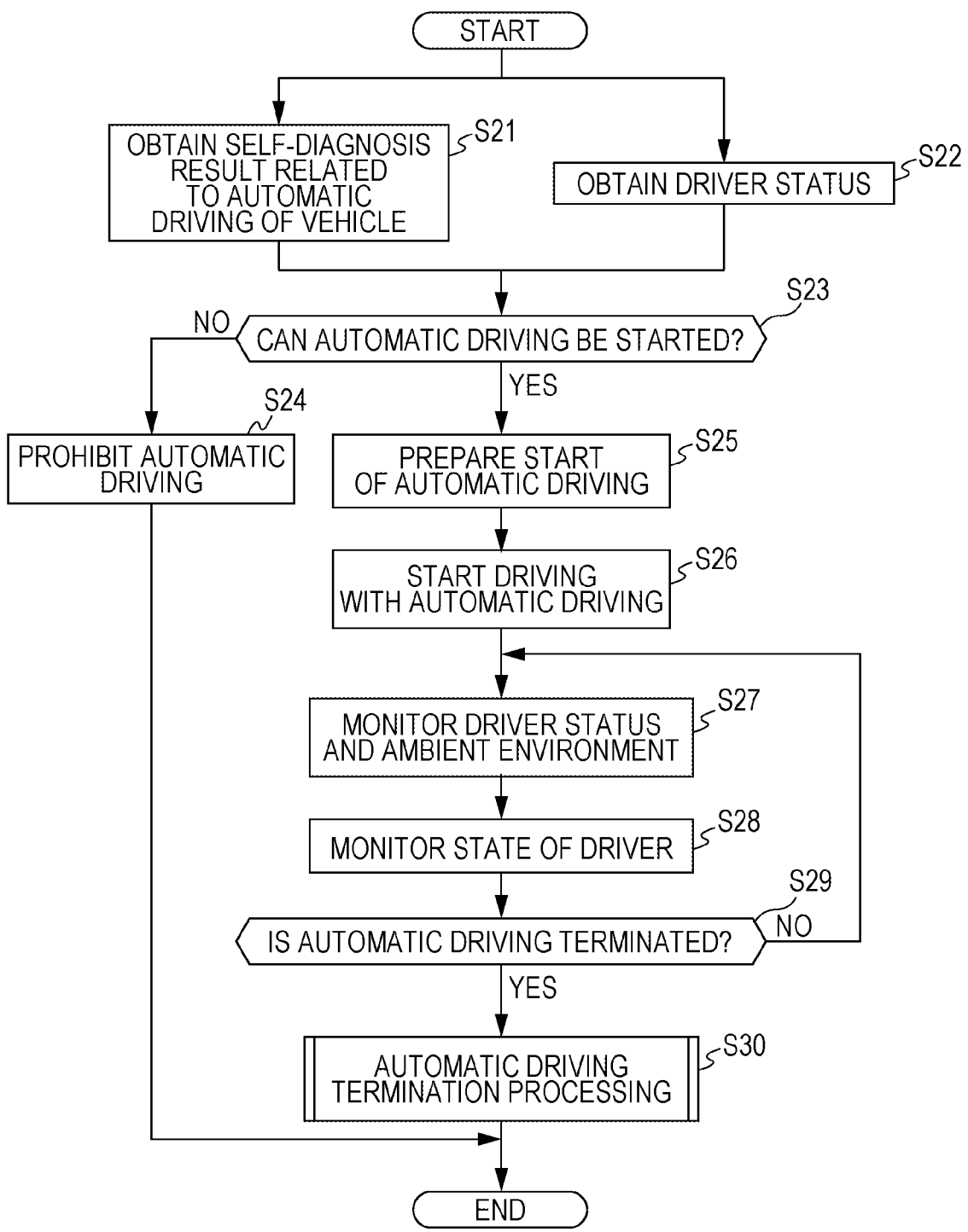
FIG. 4 is a flowchart for explaining determination processing for determining automatic driving lane driving possibility/impossibility and continuous cruising possibility/impossibility.

Subsequently, determination processing for determining automatic driving lane driving possibility/impossibility and continuous cruising possibility/impossibility will be explained with a flowchart of FIG. 4.

For example, when the driver shows an expression to start automatic driving, and more specifically, when an operation of the automatic driving start operation unit and the like is performed, the processing is started.

In step S21, the determination processing unit 26 obtains, via the input unit 24, a self-diagnosis result related to the automatic driving of the vehicle.

In parallel with step S21, in step S22, the determination processing unit 26 obtains the driver status from the monitor unit 21 in order to determine whether the driver has a level of driving ability to be able to recover back to the manual driving.

In step S23, the determination processing unit 26 determines whether automatic driving can be started or not. For example, in a case where a malfunction occurs in at least some of the devices on the basis of the self-diagnosis result obtained in step S21, the determination processing unit 26 determines that the automatic driving may not be started. Alternatively, in a case where the driver does not have any driving ability or has a low level of driving ability on the basis of the driver status obtained in step S22, the determination processing unit 26 determines that the automatic driving may not be started. For simplification in the above example, the completely automatic driving is possible in the automatic cruising-only lane, or an entry into the automatic cruising-only lane is prohibited, so that an exclusive selection is made, but in reality, even in a case where the driver does not have a complete recovery ability for complete manual driving, the driving may be possible. For example, as explained later, it is expected to drive under an emergency evacuation and a situation where a pregnant woman, a patient who may not wait for an emergency vehicle, and the like are in an emergency state in a hospital urgent driving mode.

In a case where the determination processing unit 26 determines that the automatic driving may not be started in step S23, the processing in step S24 is subsequently performed. In step S24, the determination processing unit 26 determines to prohibit automatic driving, and for example, an entry into the automatic cruising-only lane is prohibited, and the processing is terminated.

On the other hand, in a case where the determination processing unit 26 determines that the automatic driving can be started in step S23, the processing in step S25 is subsequently performed, and the determination processing unit 26 instructs the driving processing unit 32 of the driving execution unit 13 to perform start preparation of the automatic driving.

In step S26, the driving processing unit 32 controls the steering wheel control unit 33 and the speed control unit 34 to perform automatic driving on the basis of information which is provided from the environment recognition unit 31 and which is made by recognizing ambient environment, and starts driving with the automatic driving.

In step S27, the determination processing unit 26 monitors the driver status provided from the monitor unit 21, and the ambient environment provided from the environment recognition unit 31. In this case, for example, when the determination processing unit 26 detects an occurrence of a certain irregular event during the automatic cruising mode on the basis of a change in the driver status or the ambient environment, the determination processing unit 26 determines whether this event raises a certain driving risk due to continuous automatic driving in step S29, and in a case where there is a risk, a guidance is given to the driver, and when necessary on the basis of an appropriate operation, the vehicle proceeds to a mode for ending the automatic driving.

In step S28, the determination processing unit 26 recognizes the state of the driver on the basis of the driver status provided from the monitor unit 21. Then, the determination processing unit 26 determines whether the driver has a sufficient level of driving ability to recover back to the manual driving.

In step S29, the determination processing unit 26 determines whether the automatic driving is to be terminated or not, and in a case where the automatic driving is determined not to be terminated, the processing in step S27 is performed again, and thereafter, the same processing is repeated.

Figure 2:
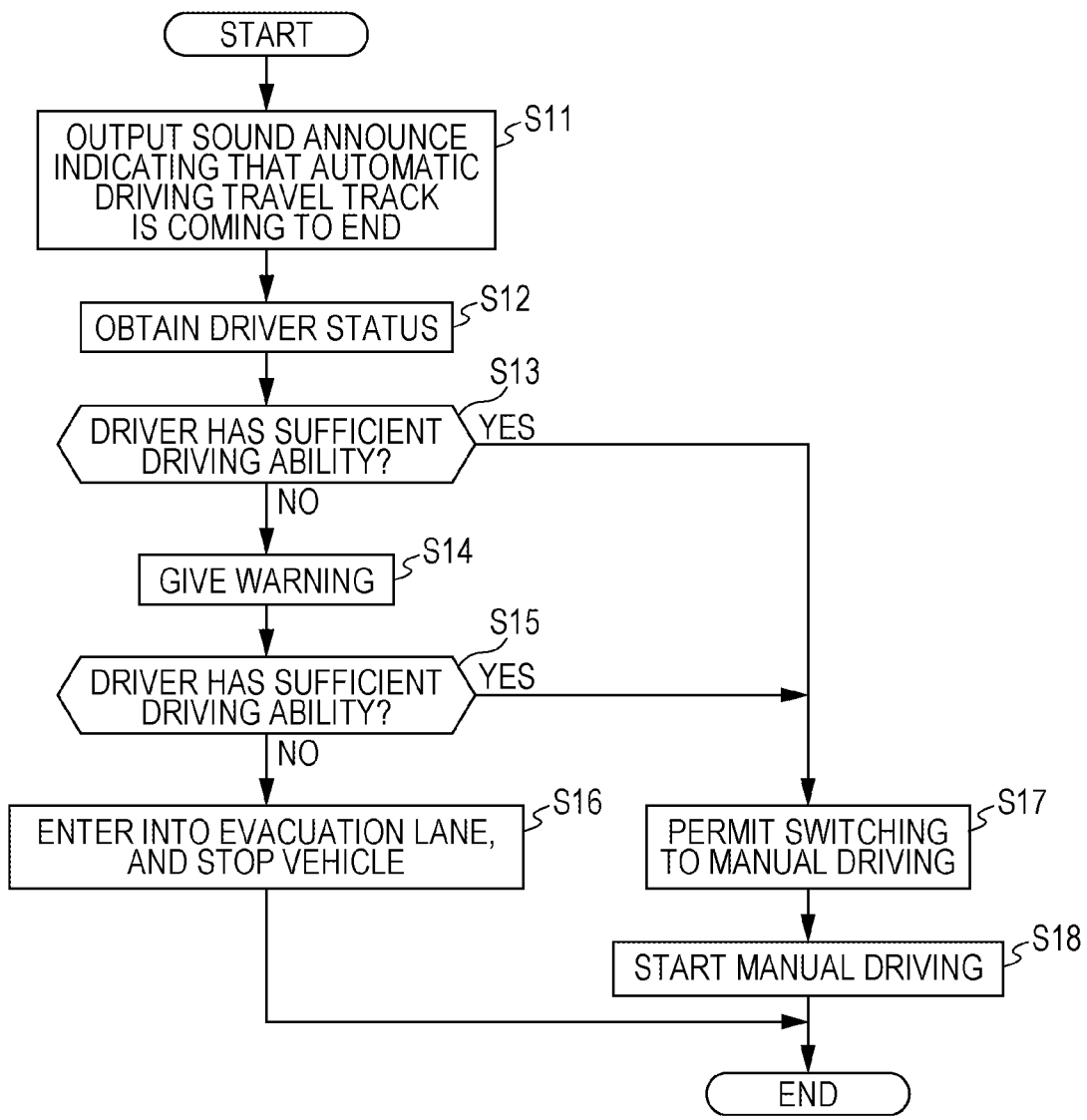
FIG. 2 is a flowchart for explaining automatic driving termination processing that is performed when automatic driving is terminated.

On the other hand, in a case where the determination processing unit 26 determines to terminate the automatic driving in step S29, the processing in step S30 is subsequently performed, and the automatic driving termination processing explained with reference to the flowchart of FIG. 2 is performed. Then, when the automatic driving termination processing is finished, the processing is terminated. Although the automatic driving termination procedure shown in FIG. 2 is described as the contents in which the end of the autonomous automatic driving-only lane section R7 is considered, the automatic driving termination procedure shown in FIG. 2 may also be a procedure for executing entry into the parking area R5 and the like unexpectedly or when moving from the autonomous automatic driving-only lane section R7 to the manual driving entry lane R13 of the general lane in order to move to the destination location at a position before the end point of the autonomous automatic driving-only lane section R7.

As described above, in a case where a malfunction occurs in at least some of the devices, or in a case where the driver does not have any driving ability or has a low level of driving ability, and it may be impossible to recover back to the manual driving, the automatic driving control device 11 prohibits an entry into the automatic cruising-only lane, so that the automatic driving can be performed more safely.

Figure 5:
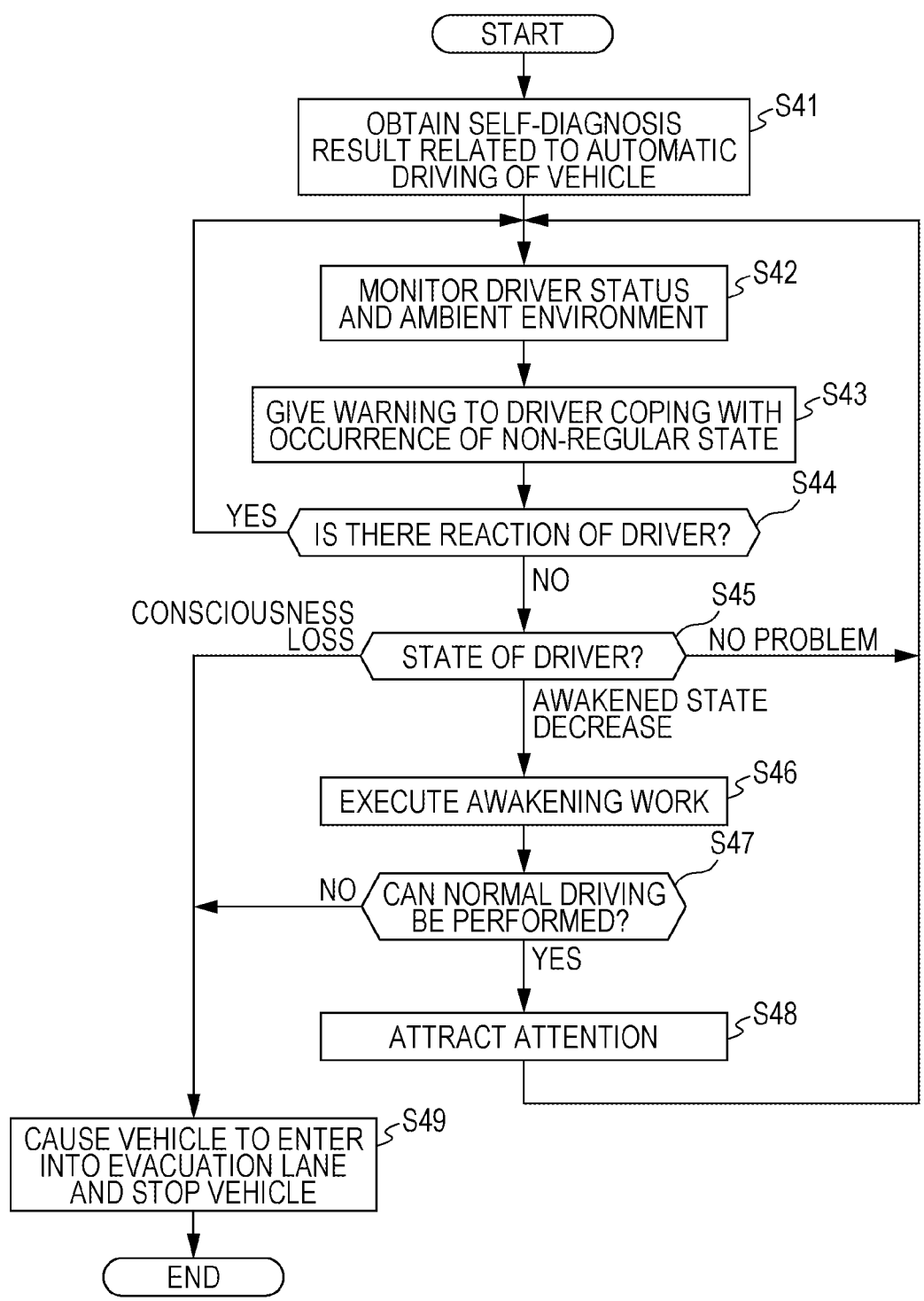
FIG. 5 is a flowchart for explaining processing for automatically evacuating to an evacuation lane in an emergency situation.

Subsequently, processing for automatically evacuating into an evacuation lane in case of emergency will be explained with reference to the flowchart of FIG. 5.

When driving is started, processing is started, and in step S41, the determination processing unit 26 obtains, via the input unit 24, a self-diagnosis result related to the automatic driving of the vehicle. It may also be possible to perform environment information acquisition necessary for autonomous automatic cruising for overall planned driving route and previous information acquisition of update information acquisition possibility/impossibility.

In step S42, the determination processing unit 26 monitors the driver status provided from the monitor unit 21, and the ambient environment provided from the environment recognition unit 31. The environment previous information necessary for the autonomous automatic cruising on the planned driving route may be obtained by means such as radio.

In step S43, the determination processing unit 26 gives warning to the driver corresponding to an occurrence of a non-regular state, and, for example, gives a notice to the driver in a tactile manner in accordance with a haptic technique such as a force feedback. The non-regular state referred to herein means a state of a planned change range of the vehicle, the road, the weather, and the like in which safe vehicle driving of the vehicle is guaranteed even if the driver is absent in the autonomous-type completely automatic driving, and a state of deviating from a design expectation environment of the autonomous-type completely automatic driving due to, e.g., a device problem of a submillimeter wave radar that affects driving of the vehicle, a problem of road guidance information, a delay of update information, and deterioration of weather environment beyond expectation. In this case, the measure for coping with the non-regular state is performed upon roughly divided into two states. One of them is a case where the vehicle continues to drive with the manual driving as it is if the driver can recover awakening normally, and the other of them is a stop of an evacuation vehicle from a dedicated lane in which a temporary stop is expected because of the lack of awakening performance of the driver. The vehicle is expected to continuously drive only in a case where the autonomous automatic driving system can ensure a certain level or higher safety risk by intervening in an assisting manner even if the driver may not completely recover awakening normally.

Figure 21A:
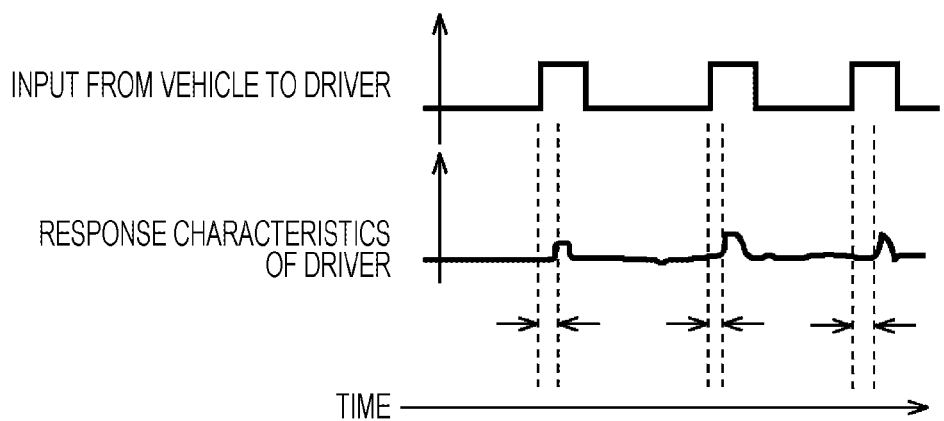
FIGS. 21A and 21B are figures for explaining operation delay of a driver.
Figure 21B:
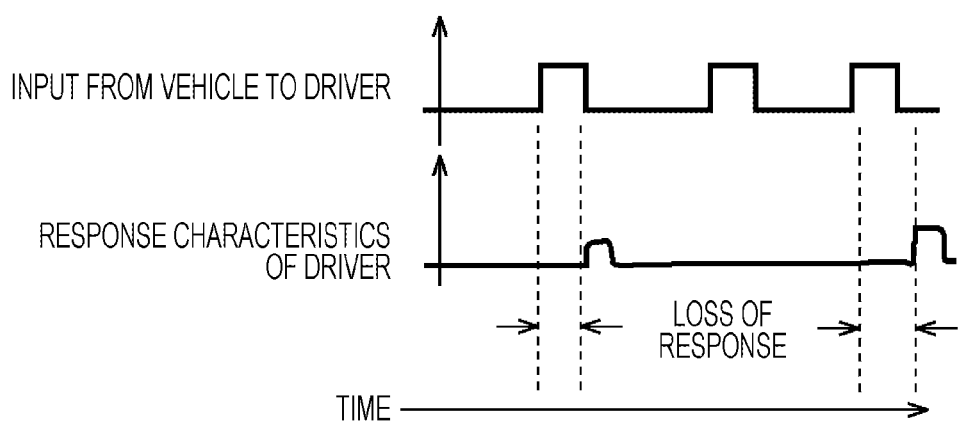

In step S44, the determination processing unit 26 determines whether the driver makes a reaction indicating a normal awakened state in response to the warning in step S43. For example, when the driver reacts in response to the warning as shown in FIGS. 21A and 21B (for example, the awakened state of the consciousness reaction is within a normal value), the determination processing unit 26 determines that there is a reaction of the driver, and the processing in step S42 is performed again, and thereafter, the same processing is repeated.

On the other hand, in a case where the determination processing unit 26 determines that there is no reaction of the driver (or, when the awakened state is insufficient), the processing in step S45 is subsequently performed. In step S45, the determination processing unit 26 determines which of "consciousness loss", "awakened state decrease", and "no problem" the state of the driver is, on the basis of the driver status provided from the monitor unit 21.

In step S45, in a case where the determination processing unit 26 determines that the state of the driver is "no problem", the processing in step S42 is performed again, and thereafter, the same processing is repeated.

On the other hand, in a case where the determination processing unit 26 determines that the state of the driver is equal to or less than "awakened state" in step S45, the processing in step S46 is subsequently performed. In step S46, the determination processing unit 26 executes awakening work for causing the driver to gain awakening, and, for example, controls the output unit 22 to output a sound announce, a warning sound, and the like.

In step S47, the determination processing unit 26 determines whether the driver can perform normal driving or not on the basis of the driver status provided from the monitor unit 21.

In a case where the determination processing unit 26 determines that the driver can perform normal driving in step S47, the determination processing unit 26 attracts attention to, e.g., proceed to the closest waiting area. Further, the determination processing unit 26 monitors whether the driver executes a corresponding operation in accordance with the attention-attraction, and after the driver executes the operation, the processing in step S42 is performed again, and thereafter, the same processing is performed.

On the other hand, in a case where the state of the driver is determined to be "consciousness loss" in step S45, or in a case where the driver is determined not to be able to perform normal driving in step S47, the processing in step S49 is subsequently performed.

In step S49, the determination processing unit 26 determines that the driver may not perform normal driving, the driving processing unit 32 of the driving execution unit 13 is caused to perform evacuation operation to the evacuation lane in accordance with the road sign, and an instruction is given to stop the vehicle. Accordingly, the driving processing unit 32 controls the steering wheel control unit 33 and the speed control unit 34 on the basis of information indicated by the external environment provided from the environment recognition unit 31, and performs automatic driving for stopping after entering into the evacuation lane. The driving processing unit 32 controls the hazard flasher control unit 35 to give warning to vehicles driving behind. Then, when the vehicle finishes stopping in the evacuation lane, the automatic driving termination processing is terminated.

Figure 6:
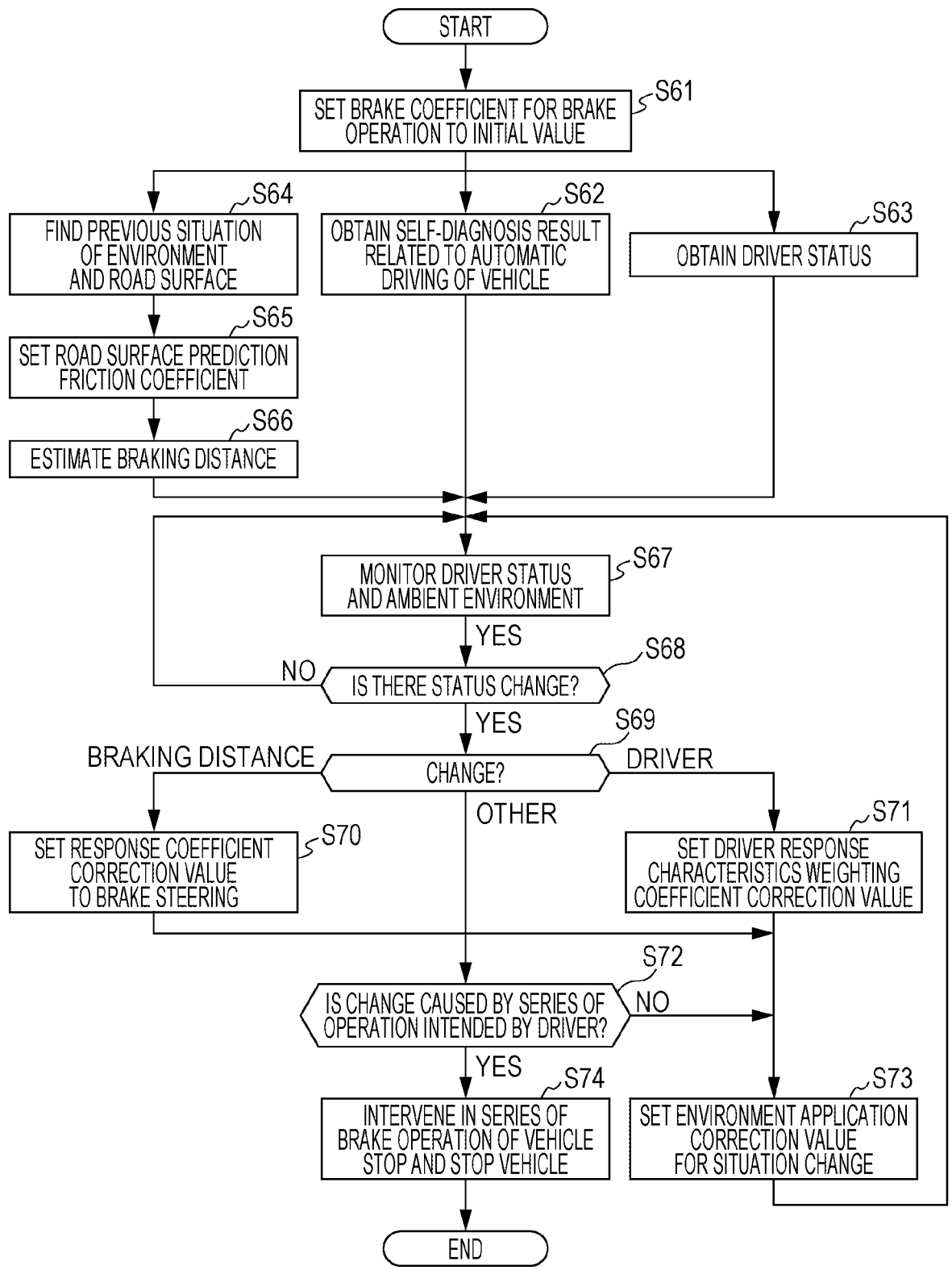
FIG. 6 is a flowchart for explaining dynamic correction processing of a brake force.

Subsequently, dynamic correction processing of a brake force will be explained with reference to the flowchart of FIG. 6.

When driving is started, processing is started, and in step S61, the driving processing unit 32 sets a brake coefficient for brake operation to an initial value.

In step S62, the determination processing unit 26 obtains, via the input unit 24, a self-diagnosis result related to the automatic driving of the vehicle, and in parallel, in step S63, the determination processing unit 26 obtains the driver status from the monitor unit 21 in order to determine whether the driver has a level of driving ability to be able to recover back to the manual driving.

Further, in parallel with step S62 and S63, the environment recognition unit 31 finds a previous situation of the environment and the road surface associated with the planned driving route in step S64. For example, the environment recognition unit 31 finds the previous situation of the environment and the road surface on the basis of the past drive history, the weather information, the maintenance situation of the brake device of the vehicle, the traffic situation, the congestion situation, and the like.

In step S65, the driving processing unit 32 sets a road surface prediction friction coefficient on the basis of the previous situation of the environment and road surface found by the environment recognition unit 31 in step S64.

In step S66, the driving processing unit 32 estimates a braking distance in accordance with the driving route, the vehicle onboard weight (whether the vehicle carries a heavy object or not) and the like.

After the processing in steps S62 to S66, the processing in step S67 is subsequently performed, and the determination processing unit 26 monitors the driver status provided from the monitor unit 21 and the ambient environment provided from the environment recognition unit 31.

In step S68, the determination processing unit 26 determines whether there is some change in the status or not, and in a case where the determination processing unit 26 determines that there is no change in the status, the processing in step S67 is repeatedly performed.

In a case where the determination processing unit 26 determines that there is a change in the status in step S68, the processing in step S69 is subsequently performed, and the determination processing unit 26 determines which of the following has occurred: the braking distance has changed, the driver has changed, and a factor other than the braking distance and the driver has changed.

In a case where the determination processing unit 26 determines that the braking distance has changed in step S69, the processing in step S70 is subsequently performed. In step S70, the driving processing unit 32 sets a response coefficient correction to the brake steering so as to cope with a change in the braking distance.

In a case where the determination processing unit 26 determines that the driver has changed in step S69, the processing in step S71 is subsequently performed. In step S71, the driving processing unit 32 sets a driver response characteristics weighting coefficient correction value so as to cope with a change in the driver.

In a case where the determination processing unit 26 determines that a factor other than the braking distance and the driver has changed in step S69, the processing in step S72 is subsequently performed. In step S72, the determination processing unit 26 determines whether it is a change caused by a series of operation intended by the driver.

In a case where the determination processing unit 26 determines that it is not a change caused by the series of operation intended by the driver in step S72, a brake characteristics update of the vehicle is confirmed in accordance with operation in continuous cruising, and the processing in step S73 is subsequently performed. After the processing in steps S70 and S71, the processing in step S73 is subsequently performed.

In step S73, the driving processing unit 32 sets an environment application correction value for a situation change, the processing in step S67 is performed again, thereafter, the same processing is performed.

On the other hand, in a case where the determination processing unit 26 determines that it is a change caused by the series of operation intended by the driver in step S72, the processing in step S74 is subsequently performed. In step S74, the driving processing unit 32 intervenes in the series of brake operation of vehicle stop, and thereafter, the processing is terminated by performing processing for stopping the vehicle. At this occasion, the driving processing unit 32 performs intervention assistance to the steering in view of a correction value for stopping (the response coefficient correction for the brake steering, the driver response characteristics weighting coefficient correction value, and the environment application correction value for the situation change) in accordance with the autonomous brake pedal operation amount of the driver. For example, in the simplest case, in a case of detecting a change in which the situation recognition delay of the driver is such that the average reaction is delayed by 0.2 seconds, a correction is performed in order to increase the brake force of the vehicle so that the vehicle can be stopped and slowed down in a short time over a distance corresponding to the braking distance in which the vehicle runs in the period of 0.2 seconds.

Figure 7:
FIG. 7 is a figure for explaining an autonomous automatic cruising termination sequence.

FIG. 7 is a figure for explaining an autonomous automatic cruising termination sequence.

It is dangerous to enter into a general manual driving road extension lane while the awakened state of the consciousness of the driver is still low when the autonomous driving automatic driving-only lane ends. Therefore, a mechanism for evacuate and stop the vehicle by providing a road line at the end portion of the autonomous driving automatic driving-only lane to guide the vehicle to a forcible stop lane guidance evacuation path b is effective.

In this evacuation lane guidance path, first, regardless of the consciousness state of the driver, the vehicle is caused to slow down and enter into the section b for guiding the road white line to an awakening non-recovery driver vehicle evacuation lane, and the vehicle passes a deceleration slow down section c for stopping, and the vehicle almost stops in a semi-stop lane d, and thereafter, the automatic guidance to an evacuation stop space (not shown) is given, so that, even in a case where the driver is not awakened from the autonomous steering of the automobile, the vehicle can make an emergency evacuation. When a scenario of multiple vehicles entering successively is expected, the vehicle is not caused to completely stop in the semi-stop lane d, and the vehicle performs automatic steering of low speed autonomous evacuation parking by recognizing a vacant space of an adjacent evacuation parking so that vehicles driving behind do not collide even if there are multiple vehicles come behind successively. The marks c and d on the road shown in the drawing are examples of dedicated road signs indicating the positions of the deceleration slow down section and the semi-stop lane by using image processing based on a perceptual manner or image processing with a camera and the like.

A determination function is provided to permit successive continuous cruising to an ordinary road by notifying, in auditory, visual, and sensory manner, an automatic driving termination announce to the driver at least 30 seconds before the end of the autonomous driving dedicated lane, and more preferably, 2 or 3 minutes before in normal driving, performing preparation of the autonomous automatic driving mode cancellation in the section a, and recognizing a result of prompting the driver to perform determination operation in accordance with a procedure defined in advance, and in a case where the awakening recovery state of the driver is not preferable, the vehicle is caused to automatically enter into the evacuation lane of the section b as it is.

In a case where the awakening recovery state is sufficiently made in advance, the vehicle deviates from the lane marker in the evacuation white line direction of the section b, the driver performs ordinary manual driving to the road extension ordinary road section under the consciousness steering of the driver, and the travel track is made into a continuous cruising.

As described above, the automatic driving control device 11 also has the function of determining the awakening recovery ability of the driver. In a vehicle having some kind of automatic driving function, the driver can perform continuous cruising even if the driver does not maintain a high level of consciousness state of all the devices related to driving thanks to the automatic driving system of the vehicle.

A typical example of that function is a lane maintaining (departure prevention) system, and is a forward car following system that covers stop and start (stop & go) such as CACC (Cooperative Adaptive Cruise Control). These devices have the effect of reducing the burden of the driver, but the driver relies on the system, and normal stable forward driving is made possible even in the state in which the consciousness is low, and therefore, the vehicle can physically drive in a stable manner even in a state in which the awakened state of the driver is low.

Generally speaking, when a person recovers from the state in which the consciousness state is low, the person is confused because the person may not understand the situation surrounding him or her, or the person continues to have consciousness in the dream, and the person is busy trying to understand the situation surrounding him or her in reality and fails to make a sudden judgement, and further, the person may do an action that may not be expected under the awakened state such as a reflective convulsion of muscles in the dream. Therefore, when automatic driving becomes widely prevalent, there occurs a drowsy driving in a deeper state and there occurs a lower degree of consciousness from driving, and therefore, the awakened state determination of the driver plays an important role during manual driving recovery, and it is necessary to determine the situation judgement performance suitable for the ambient environment.

For example, units for intentionally inputting visually unspecific information to the driver from the infrastructure environment such as a road and determining the driver awakened state on the basis of whether a result appropriately involves a reaction of the driver for the contents of the unspecific information is effective as a method for actively and efficiently performing appropriate ambient situation determination.

In an embodiment, a sign of which content is variable is provided on a road for consciousness/awakening degree determination of the driver, and the driver performs input operation of the determination device in accordance with the content, so that the awakened state determination of the driver is performed. For example, numerical value display is performed continuously for two portions with advancement on the road, and the consciousness determination of the driver is performed in view of an operation for correctly manipulating a button, the acceleration, and the steering wheel in response to the numerical values and the operation result.

A method of visual feedback includes moving and displaying, in time series, (for example, successively turning on signal signs) multiple visual targets of which display contents are changed in multiple directions in which the positional relationships are unspecific for the driver on the road surface and the places thereabouts, and statistically determining appearance of a movement track of the line of sight of the driver in the visual line direction of the driver in synchronization with the timing of the moving display, and determining whether the driver has recovered to the visual line operation level unique to the consciousness possessed by the driver. In a case where there is a symptom of the decrease in the level of awakening such as a long delay in capturing the line of sight of the target object or a large difference in the direction of sight, the awakening is determined to be insufficient.

In another embodiment, automatic driving cancellation reservation is performed in the buffer section of the end of the automatic lane termination, and, for example, a lane is designed to wind gently to the right and the left on the dedicated road, and a determination is made as to whether the vehicle performs driving operation along the lane in that section with steering under consciousness of the driver.

The automatic driving control device 11 can take measures in congestion and can take measures when the emergency automatic driving evacuation parking lot is full. For example, when vehicles that may not recover back to the manual driving are gathered in the evacuation parking lot, it is necessary to prevent the parking lot from being full and prevent the failure to ensure evacuation of the vehicles driving behind.

Therefore, the vehicles driving behind make early transition to the general manual lane in accordance with the amount of traffic of the dedicated road, and therefore, it effective to reduce the number of vehicles failing to be awakened and entering into the evacuation parking lot by giving an advance awakening recovery guidance to the vehicles in the autonomous automatic cruising at a point in time earlier than a normally specified previous preparation. More specifically, the vehicle space failing to be awakened and entering into the evacuation parking space from the autonomous automatic cruising is limited, and there is also a risk that the evacuation parking space suddenly becomes full, and therefore, it is effective to cause the automatic driving vehicle that comes from behind to switch the travel track into the manual driving at an earlier point in time, thus increasing the reliability of transition to the ordinary road.

The automatic driving control device 11 also has a judgement performance determination for determining the road environment variation situation of the driver using an active illumination sign in synchronization with the approaching vehicle.

The performance of judgement of the driver in response to the road environment variation situation will be explained with reference to FIG. 8.

Figure 8A:
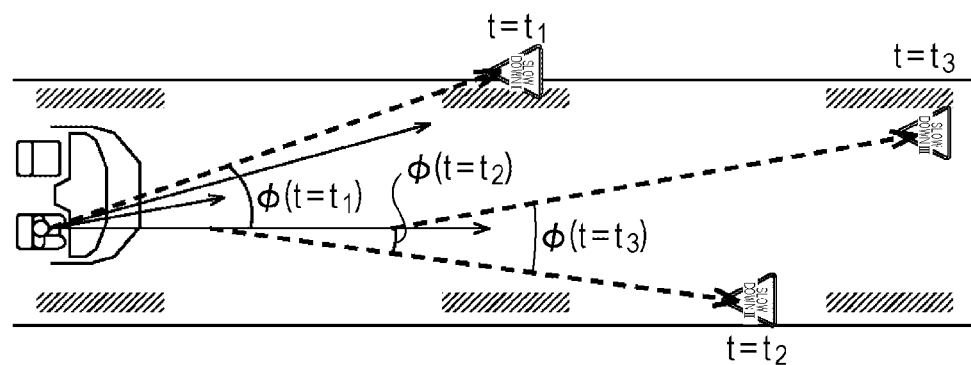
FIGS. 8A and 8B are figures for explaining performance of determination of a driver with regard to a road environment variation situation.
Figure 8B:
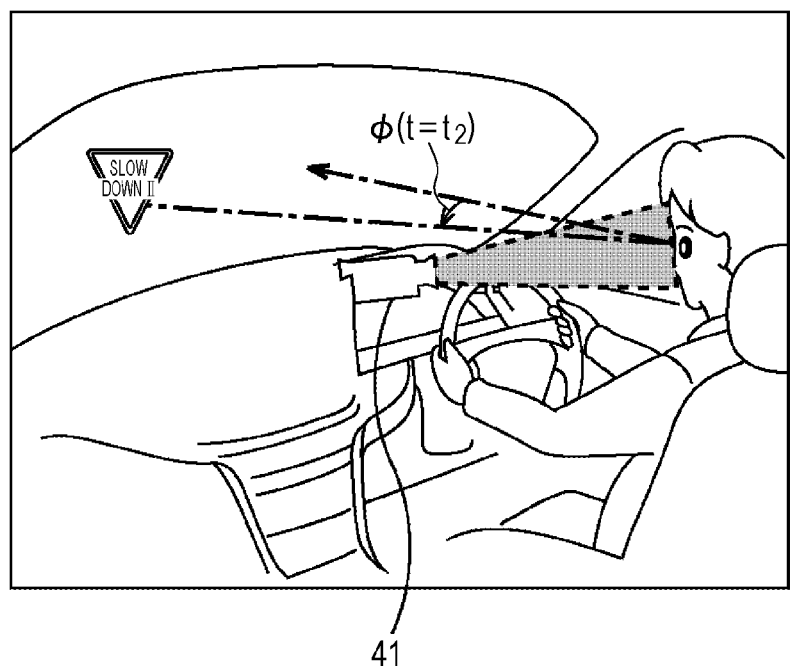

FIG. 8A illustrates a road corresponding to the section a of FIG. 7, and FIG. 8B illustrates the inside of the vehicle having the automatic driving control device 11.

As shown in FIG. 8B, a camera 41 provided inside of the vehicle is arranged to be able to capture the face of the driver. For example, the image captured by the camera 41 is provided to the monitor unit 21, and the monitor unit 21 recognizes the line of sight of the driver, so that the state of the driver can be recognized.

Therefore, for example, when the driver moves the line of sight by seeing the illuminated sign, and the monitor unit 21 raises the degree of reliability by finding the response reaction according to the display order with multiple operations, e.g., from t=t1 to t=t3, as shown in FIG. 8A, or ensures the degree of reliability of the awakening determination with an operation (a button operation and the like in response to a numerical value) in response to a display content (a numerical value and the like not shown).

Then, the monitor unit 21 determines whether the driver is appropriately finding, in a visual manner, signs illuminated and displayed from the infrastructure-side sign, and when the driver performs an operation according to the sign content, the monitor unit 21 determines that the awakening consciousness state is high. On the other hand, the monitor unit 21 determines that the recovery ability is poor when the reaction is slow and there is no corresponding reaction or the corresponding reaction is insufficient. In the reaction determination, examples of operation contents of an easy human machine interface that imposes as less burden as possible include a button operation, successive repeated opening and closing of the eyelids, slight turning of the steering wheel to the right and the left, a shallow operation of the acceleration pedal, and the like.

As described above, the automatic driving control device 11 can determine the driving ability by inputting the consciousness degree of the driver to the ambient environment from the infrastructure-side environment and analyzing a response situation of the driver in response to the input. More specifically, as shown in FIG. 8, the automatic driving control device 11 visually presents a unique display content, which is to be recognized by the driver, on an infrastructure-side installation sign, and the driver performs a necessary reaction operation in response to the display content, so that the consciousness state can be determined. In FIG. 8, the visual input has been shown as an example, but an oral response in reply to a sound guidance based on radio, and a button steering, and the like can also be used in the same manner for the awakened state determination.

The automatic driving control device 11 determines the environment acknowledgement degree of the driver on the basis of a consciousness determination result of the driver based on an input of unique visual information of the road on which the vehicle is driving from the infrastructure or auditory information given via units such as radio, and the intervention ratio of the safe automatic driving system can be changed (correction of the coefficient of FIG. 6) in accordance with the acknowledgement degree of the determination result.

It should be noted that the monitor unit 21 may not only perform such sight line recognition of the driver but also obtains the behavior of the reaction operation of the driver, for example, operation transition observation of transition to various vehicle control input units such as the acceleration pedal operation state of the vehicle, the brake pedal operation state, the clutch operation state, and the steering wheel operation state, and further the head part posture state of the driver, motion tracking of the line of sight, sight line saccade movement analysis, and the like, and detects the decrease in the level of awakening by finding a change of the awakened state from a temporal change in a period in which the awakened state is high. For example, when there is a decrease in the level of awakening, the optimum driving steering amount and the vehicle speed begin to deviate because of the decrease in the consciousness during driving operation, and therefore, in contrast to normal gentle steering, unnatural sudden steering increases, e.g., the driver repeats sudden correction operation to try to correct the deviation. In the saccade movement of the line of sight, an operation for causing the line of sight to follow the target object little by little at a high speed is repeated, but when there is a decrease in the awakened state, the saccade movement for following an obstacle with the line of sight becomes dull in general.

More specifically, the vehicle equipped with the sight line recognition function and the vehicle forward obstacle recognition device tracks the sight line direction change of the driver, and at the same time, the vehicle monitors a transition of occurrence of the degree of instantaneous match of the direction of the obstacle with respect to the driver that is estimated from arrangement analysis of the obstacle in the vehicle driving direction, and further monitors the transition of the stability of so-called sight line saccade movement which is a high speed movement of the line of sight, so that the awakening degree status of the driver can be determined. While the vehicle drives with normal stable driving steering, a vehicle and the like in the vehicle driving direction forward advances in the same direction as the vehicle in question, and the ambient environment moves with a speed vector in the opposite direction opposing the vehicle in question in a relative manner. Therefore, the driver continues driving while moving the line of sight to the car driving ahead and the ambient environment as necessary.

The analysis of the line of sight as described below is effective as means for determining the awakened state of the driver. More specifically, in the operation during actual driving, the driver does not see each and every piece of environment information for a certain period of time. In reality, in accordance with the situation and also in accordance with the experience of the driver, the environment acknowledgement performance, the performance at that time, and the like, the line of sight is quickly moved, and the driver repeats the movement of the line of sight in order to find a forward obstacle and the environment position shape relationship in association with the degree of effect on the driver's vehicle. Then, when the monitoring of the degree as to how much the direction of the line of sight of the driver himself/herself matches the direction of the obstacle detected by the above-explained vehicle forward obstacle recognition device with respect to the driver is further considered into details, in the movement of the line of sight of the driver, a movement of the line of sight for an obstacle candidate is necessary for a subsequent operation.

In this case, the saccade movement is an operation for moving, at a high speed, the direction of the center of the line of sight to the direction which is considered to be necessary for a person to pay attention to in the ambient visual field, and a salience map is a scheme for estimating a portion where a person is likely to pay attention to in the image.

As described above, the motion of the line of sight of the driver is recognized and the awakening determination of the driver is performed, so that, for example, in a case where the vehicle is provided with an ADAS (Advanced Driving Assistant System) system and performs direction detection of a forward obstacle, it is expected to produce an effect such as performing the monitoring of time-series analysis of correlation with the obstacle recognition device and the line of sight of the driver, evaluation time-series change of an agility evaluation point of the saccade movement of the line of sight of the driver. In any case, the driving environment finding performance of the driver has physical characteristics unique to the driver, and therefore, in the state determination, the vehicle can be provided with determination threshold value learning of a consciousness state decrease point of the driver characteristics.

In this case, various kinds of processing executed in the automatic driving control to which the present technique is applied will be further explained with reference to FIGS. 9 to 23.

Figure 9:
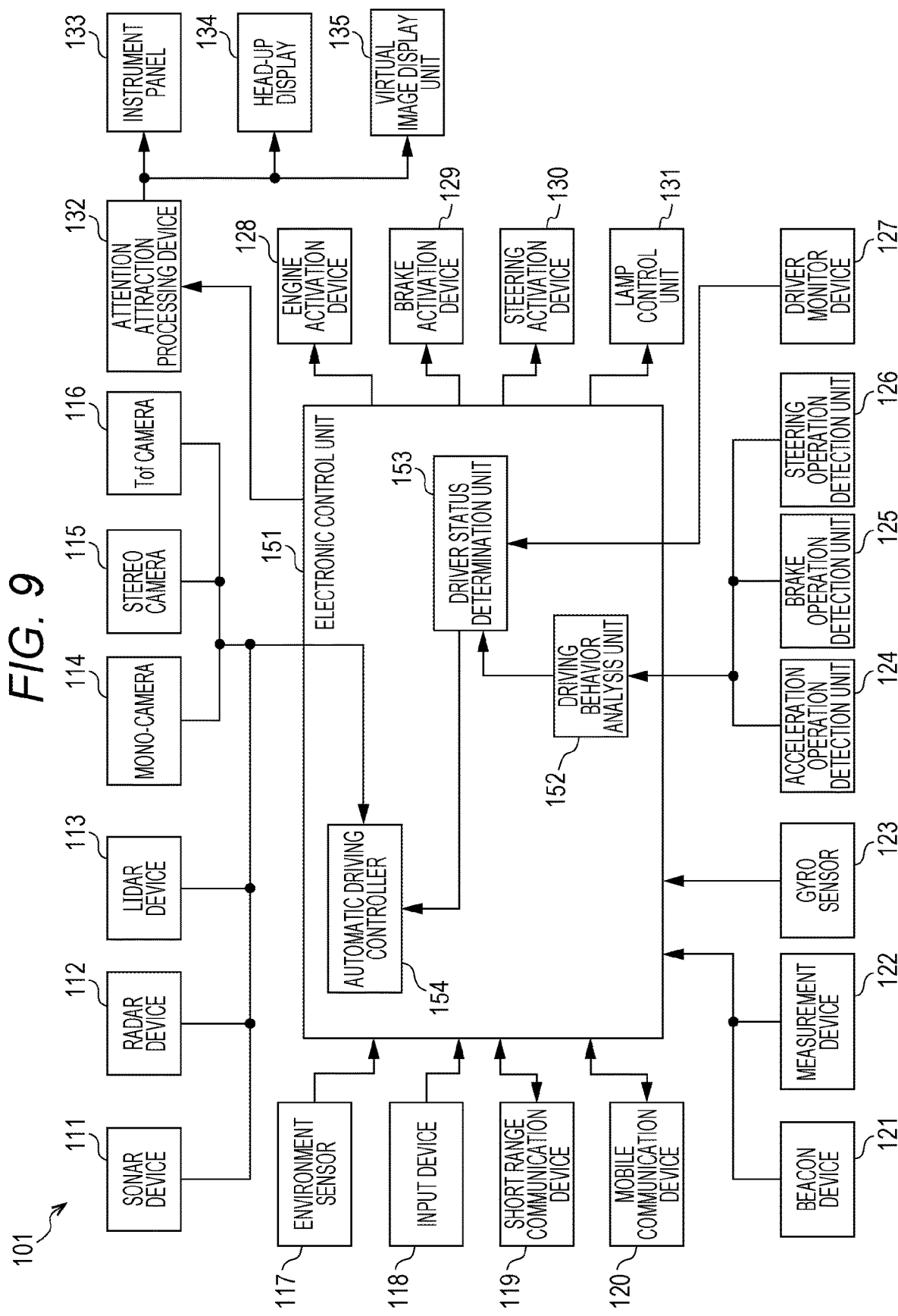
FIG. 9 is a block diagram illustrating an example of configuration of an automatic driving control system.

FIG. 9 is a block diagram illustrating an example of configuration of an automatic driving control system to which the present technique is applied.

As shown in FIG. 9, an automatic driving control system 101 is configured to include a sonar device 111, a radar device 112, an LIDAR device 113, a mono-camera 114, a stereo camera 115, Tof (Time_of_flight) camera 116, an environment sensor 117, an input device 118, a short range communication device 119, a mobile communication device 120, a beacon device 121, a measurement device 122, a gyro sensor 123, an acceleration operation detection unit 124, a brake operation detection unit 125, a steering operation detection unit 126, a driver monitor device 127, an engine activation device 128, a brake activation device 129, a steering activation device 130, a lamp control unit 131, an attention attraction processing device 132, an instrument panel 133, a head-up display 134, a virtual image display unit 135, and an electronic control unit 151.

The sonar device 111, the radar device 112, and the LIDAR device 113 detect an object around the vehicle (such as another vehicle, a pedestrian, and the like) in order for the vehicle to perform the automatic driving, and provide a relative distance to the detected object to the automatic driving controller 154 of the electronic control unit 151.

The mono-camera 114, the stereo camera 115, and the Tof camera 116 recognize an object shown in an image obtained by capturing the surrounding of the vehicle in order for the vehicle to perform the automatic driving, and provides information about the recognized object to the automatic driving controller 154 of the electronic control unit 151. For example, the stereo camera 115 and the Tof camera 116 measure the distance to the recognized object, and provides the distance to the object to the automatic driving controller 154 of the electronic control unit 151.

The environment sensor 117 detects the environment around the vehicle such as the temperature, the humidity, the weather, the road surface situation, and the like, and provides the environment detection result to the electronic control unit 151.

The input device 118 includes, e.g., a microphone with which the driver gives an input by using sound, and an operation unit with which the driver gives an input by using operation with buttons and touch panel, and when the driver gives an input, the input device 118 provides the input content to the electronic control unit 151.

The short range communication device 119 uses DSRC (Dedicated Short Range Communications), which is a radio communication technique designed specifically for radio communication of vehicles, to communicate with an ITS (Intelligent Transport Systems) spot installed along the road, and obtains traffic jam information, regulation information, and the like.

The mobile communication device 120 communicates in accordance with a communication standard (3G/4G) according to which cellular phones communicate, and, for example, the mobile communication device 120 obtains various kinds of information via a network such as the Internet.

For example, the beacon device 121 communicates with a road side device installed at the roadside to support safe driving, and obtains various kinds of traffic information.

The measurement device 122 uses a satellite navigation system such as GPS (Global Positioning System) for measuring the current position by using, for example, an artificial satellite to measure the current position of the vehicle.

The gyro sensor 123 detects the acceleration and the angular speed of the vehicle used in autonomous position analysis processing for analyzing the current position of the vehicle in an autonomous manner.

The acceleration operation detection unit 124 detects an operation of the driver with the accelerator, the brake operation detection unit 125 detects an operation of the driver with the brake, and the steering operation detection unit 126 detects an operation of the driver with the steering. The acceleration operation detection unit 124, the brake operation detection unit 125, and the steering operation detection unit 126 obtain, for example, the timing with which the driver performs operation, the operation amount, and the like as an operation detection result, and provides the operation detection result to the driving behavior analysis unit 152 of the electronic control unit 151.

The driver monitor device 127 monitors the driver by using various kinds of sensors for detecting the awakened state of the driver (for example, an alcohol sensor, a pulsation sensor, an odor sensor, and the like). For example, the driver monitor device 127 captures an image of the face of the driver using a camera, recognizes the line of sight of the driver, and monitors the motion of the line of sight. Then, the driver monitor device 127 provides the monitor result obtained by monitoring the driver to the driver status determination unit 153 of the electronic control unit 151.

The engine activation device 128 controls starting of the engine of the vehicle in accordance with an instruction given by the automatic driving controller 154 of the electronic control unit 151.

The brake activation device 129 controls activation of the brake of the vehicle in accordance with an instruction given by the automatic driving controller 154 of the electronic control unit 151.

The steering activation device 130 controls activation of the steering of the vehicle in accordance with an instruction given by the automatic driving controller 154 of the electronic control unit 151.

Figure 17:
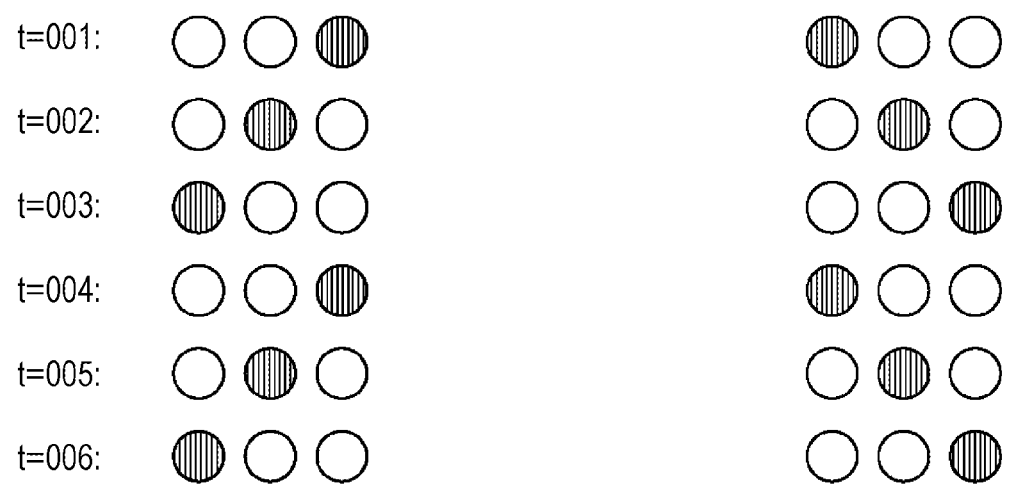

For example, the lamp control unit 131 controls flashing of a hazard flasher when the vehicle proceeds to the evacuation lane as shown in FIG. 17 explained later, in accordance with an instruction given by the automatic driving controller 154 of the electronic control unit 151.

The attention attraction processing device 132 performs processing to attract the attention of the driver in accordance with an instruction given by the automatic driving controller 154 of the electronic control unit 151. For example, the attention attraction processing device 132 gives a haptic feedback such as vibrating the steering and the seat and pulling the seat belt.

The instrument panel 133 includes various kinds of instruments and the like such as a speedometer and a navigation display which are arranged thereon, and, for example, the instrument panel 133 gives a notification to the driver by displaying a message on the display.

For example, the head-up display 134 is a display unit provided at the upper portion of the windshield, and displays a message notified to the driver, a dummy target explained with reference to FIG. 18, and the like.

The virtual image display unit 135 displays a virtual image, which augments the real world, in an overlapping manner on the real world that can be seen from the driver.

The electronic control unit (ECU) 151 can have various kinds of functions by executing a program for controlling each block constituting the automatic driving control system 101. For example, in the example of FIG. 9, the electronic control unit 151 includes the functions as the driving behavior analysis unit 152, the driver status determination unit 153, and the automatic driving controller 154.

The driving behavior analysis unit (Operation Behaviour Analyzer) 152 analyzes the driving behavior of the driver (an operation of driving, behavior, and the like) on the basis of the operation detection result provided from the acceleration operation detection unit 124, the brake operation detection unit 125, and the steering operation detection unit 126. Then, the driving behavior analysis unit 152 provides the analysis result obtained by analyzing the driving behavior of the driver to the driver status determination unit 153.

The driver status determination unit 153 performs processing for determining the driver status indicating the awakened state of the driver on the basis of the monitor result provided from the driver monitor device 127 and the analysis result provided from the driving behavior analysis unit 152. Then, the driver status determination unit 153 provides the determination result of the driver status to the automatic driving controller 154. Although not shown in the drawing, inputs to the driver monitor device 127 are considered to include not only the recognition of the line of sight and the face but also electrocardiogram, thermography, body odor, breath, skin temperature distribution, breathing state, and the like of the driver.

The automatic driving controller 154 gives various kinds of instructions necessary for the automatic driving of the vehicle to the engine activation device 128, the brake activation device 129, the steering activation device 130, the lamp control unit 131, and the attention attraction processing device 132, on the basis of the determination result of the driver status provided from the driver status determination unit 153.

It should be noted that various kinds of processing executed by the driver status determination unit 153 and the automatic driving controller 154 will be explained in details with reference to the flowchart explained later.

Figure 10:
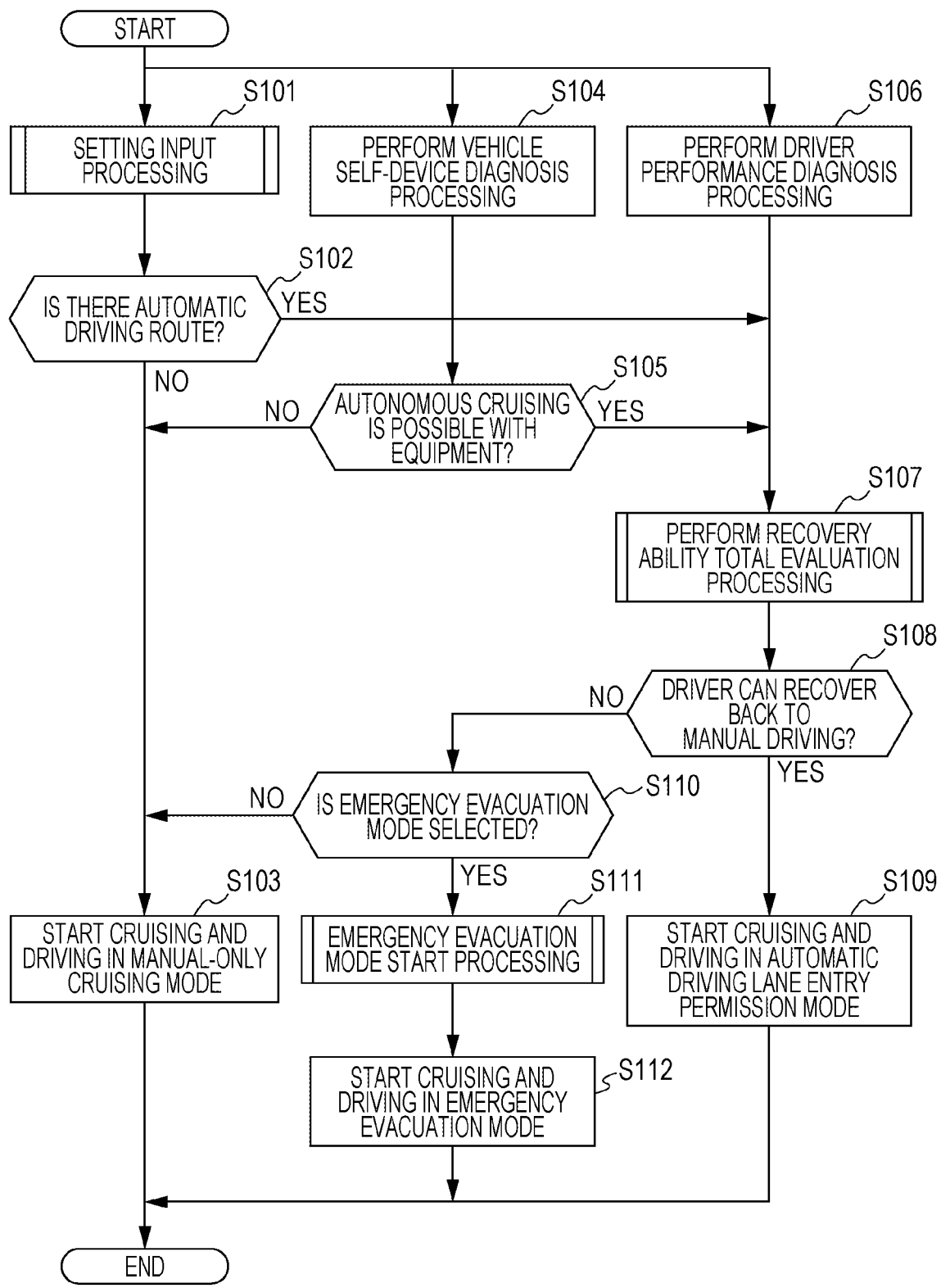
FIG. 10 is a flowchart for explaining initial determination processing.

FIG. 10 is a flowchart for explaining initial determination processing performed by the automatic driving control system 101.

First, in step S101, the automatic driving control system 101 uses an input based on sound or operation with the input device 118, an indication on the display provided in the instrument panel 133, and the like to perform setting input processing to input setting necessary for starting the automatic driving. For example, in the setting input processing, as explained with reference to the flowchart of FIG. 11, a selection of a route to the destination location, a selection as to whether the automatic driving is performed in the emergency evacuation mode or not, and the like are performed.

In step S102, the automatic driving controller 154 refers to map data stored in a memory unit, not shown, and determines whether there is an automatic driving lane or not in the route selected in step S101.

In step S102, in a case where the automatic driving controller 154 determines that there is an automatic driving lane, the processing in step S107 is subsequently performed, and in a case where the automatic driving controller 154 determines that there is no automatic driving lane, the processing in step S103 is subsequently performed.

In step S103, the automatic driving controller 154 determines to start the cruising and driving in the manual-only driving mode in which the vehicle drives with only the manual driving performed by the driver, and terminates the initial determination processing. Thereafter, the automatic driving control system 101 restricts the automatic driving performed by the automatic driving controller 154, and drives the vehicle with the manual driving performed by the driver.

In parallel with step S101, the automatic driving controller 154 performs vehicle self-device diagnosis processing for diagnosing the equipment of the vehicle necessary for performing the automatic driving in step S104. For example, in the vehicle self-device diagnosis processing, a confirmation is performed to find as to whether all the blocks constituting the automatic driving control system 101 as shown in FIG. 9 operate normally or not.

In step S105, the automatic driving controller 154 determines whether the autonomous driving is possible or not on the equipment in accordance with the diagnosis result in the vehicle self-device diagnosis processing of step S104. For example, in a case where all the blocks constituting the automatic driving control system 101 operate normally, the automatic driving controller 154 determines that the autonomous driving is possible on the equipment, and in a case where at least any one of the blocks does not operate normally, the automatic driving controller 154 performs the risk diagnosis, and in a case where the safe driving risk is not equal to or less than a predetermined level, the automatic driving controller 154 determines that the autonomous driving is not possible on the equipment.

In a case where the automatic driving controller 154 determines that the autonomous driving is not possible on the equipment in step S105, the processing in step S103 is subsequently performed, and in the same manner as described above, it is determined to start the cruising and driving in the manual-only driving mode, and the initial determination processing is terminated.

In parallel with steps S101 and S104, the automatic driving controller 154 performs the driver performance diagnosis processing for diagnosing the driver's driving ability on the basis of the determination result of the driver status provided from the driver status determination unit 153 in step S106.

After the processing in step S106, or, in a case where the autonomous driving is determined to be possible on the equipment in step S105, the processing in step S107 is subsequently performed. In step S107, the automatic driving controller 154 performs recovery ability total evaluation processing (the processing in the flowchart of FIG. 12 explained later) for predicting the recovery ability from the automatic driving to the manual driving and performs evaluation in a total manner.

In step S108, the automatic driving controller 154 predicts and determines whether the driver has a recovery ability for recovering back to the manual driving after the automatic driving is terminated on the basis of the evaluation result of the recovery ability total evaluation processing of step S107.

In a case where the automatic driving controller 154 determines that the driver has a recovery ability for recovering back to the manual driving in step S108, the processing in step S109 is subsequently performed.

In step S109, the automatic driving controller 154 determines to start the cruising and driving in the automatic driving lane entry permission mode for permitting the automatic driving in the automatic driving lane which is in the route selected in step S101, and terminates the initial determination processing. Thereafter, in the automatic driving control system 101, before the vehicle enters into the automatic driving lane, the above-described road environment R2 is a buffer zone road before entering into the completely automatic driving-only lane before the ordinary road. In this buffer zone road, it is determined that there is a recovery performance as a result of the determination processing before that, and the vehicle drives with the automatic driving performed by the automatic driving controller 154.

On the other hand, in step S108, the automatic driving controller 154 determines that the driver does not have a recovery ability for recovering back to the manual driving, the processing in step S110 is subsequently performed.

Figure 11:
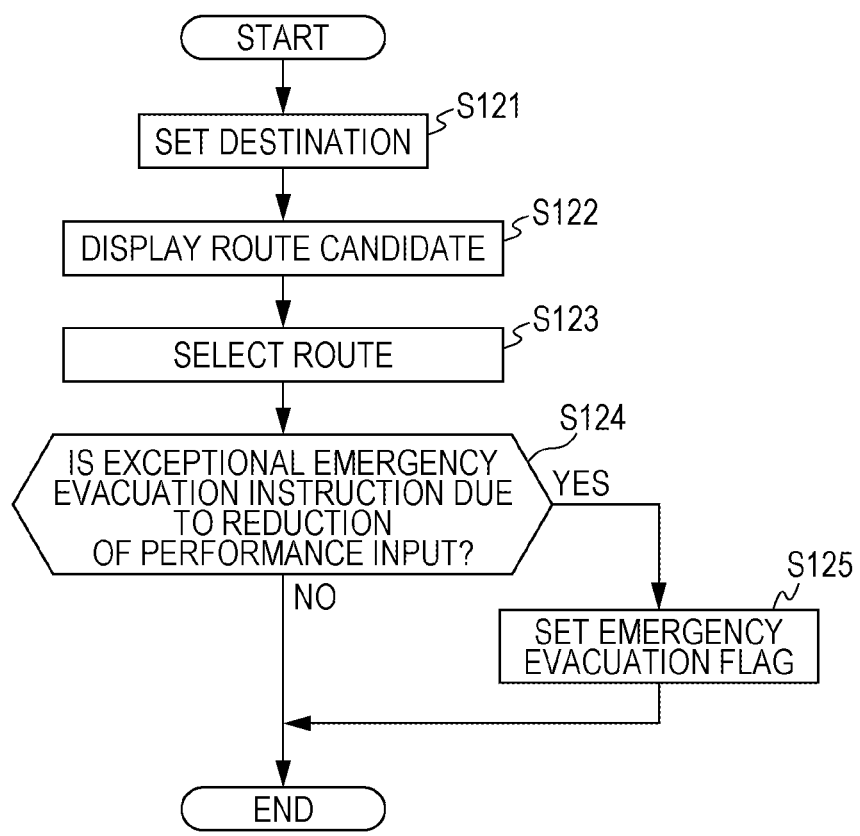
FIG. 11 is a flowchart for explaining setting input processing.

In step S110, the automatic driving controller 154 determines whether the emergency evacuation mode is selected or not in the setting input processing of step S101 (FIG. 11).

In a case where the emergency evacuation mode is determined to be selected in step S110, the processing in step S103 is subsequently performed, and in the same manner as described above, it is determined to start the cruising and driving in the manual-only driving mode (and, continue that if the vehicle is already driving), and the initial determination processing is terminated.

On the other hand, in step S110, it is determined that the emergency evacuation mode is selected, the processing in step S111 is subsequently performed. In step S111, the automatic driving controller 154 performs emergency evacuation mode start processing (the processing of the flowchart of FIG. 13 explained later) for making for setting or changing necessary to start the emergency evacuation mode.

In step S112, the automatic driving controller 154 determines to start the cruising and driving in the emergency evacuation mode, and terminates the initial determination processing. Thereafter, in the automatic driving control system 101, after the vehicle enters into the automatic driving lane, the automatic driving performed by the automatic driving controller 154 is exceptionally executed. When the vehicle enters into the driving in the emergency evacuation mode, the status transition and condition is recorded and saved.

Subsequently, FIG. 11 is a flowchart for explaining setting input processing in step S101 of FIG. 10.

In step S121, when the driver inputs the destination location by a sound or an operation, the input is received by the input device 118, and the destination location is set. Then, the input device 118 provides the location information about the destination location to the automatic driving controller 154.

In step S122, the automatic driving controller 154 refers to map data stored in a memory unit, not shown, on the basis of the location information about the destination location provided in step S121, and searches the route from the current location to the destination location. Then, the automatic driving controller 154 displays multiple route candidates obtained as a result of the search on, for example, a display provided on the instrument panel 133.

In step S123, when the driver inputs a route selected from among multiple route candidates by using a sound or an operation, the input device 118 informs the automatic driving controller 154 of the received route. Then, the automatic driving controller 154 selects the route selected by the user as the route in which the vehicle drives.

In step S124, the automatic driving controller 154 determines whether the automatic driving controller 154 has received an emergency evacuation instruction for exceptionally performing the automatic driving when the driver's driving ability becomes lower. For example, the automatic driving controller 154 displays, on a display provided on the instrument panel 133, a message for asking whether to exceptionally perform the automatic driving or not when the driver's driving ability becomes lower, and makes a determination in accordance with the user's input in response to the message.

In a case where the emergency evacuation instruction is determined not to be input in step S124, the setting input processing is terminated as it is. On the other hand, in a case where the emergency evacuation instruction is determined to be input in step S124, the automatic driving controller 154 sets an emergency evacuation flag in step S125, and thereafter the setting input processing is terminated. In the present embodiment, the destination location setting of the driving and the route selection are performed with the display interface and the instruction input, but in a case where a seamless and simple method is put into practice in the future, the HMI may be achieved with a sound guidance, a sound input, a gesture input, and the like, and further, the following case may also be possible, e.g., destination locations may be automatically narrowed down from a previous plan before riding the vehicle, and a suggestion may be presented, but the embodiment is not limited to this example.

Figure 12:
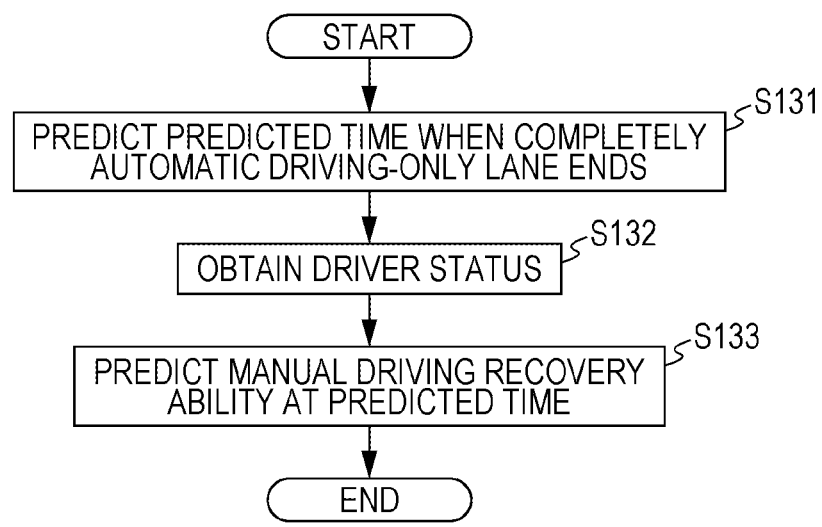
FIG. 12 is a flowchart for explaining recovery ability total evaluation processing.

Subsequently, FIG. 12 is a flowchart for explaining recovery ability total evaluation processing in step S107 of FIG. 10.

In step S131, the automatic driving controller 154 predicts the predicted time when the completely automatic driving-only lane ends on the route selected in step S123 of FIG. 11 and a switching to the manual driving occurs. It should be noted that the prediction of the predicted time will be explained in details with reference to FIG. 23 explained later.

In step S132, the driver status determination unit 153 obtains the driver status from various kinds of data monitored by the driver monitor device 127, and provides the driver status to the automatic driving controller 154. For example, the driver status determination unit 153 obtains, as the driver status, biometric information about the driver such as the stability of the line of sight, the alcohol intake degree, the pulsation, a face recognition fatigue degree measurement result, an odor measurement result, a response evaluation of the driver according to the human machine interface, and the like.

In step S133, the automatic driving controller 154 totally calculates the degree of fatigue, the awakening degree, and the like of the driver at the predicted time predicted in step S131 on the basis of the driver status provided in step S132. Then, the automatic driving controller 154 derives, as the evaluation result of the recovery ability total evaluation processing, the manual driving recovery ability of the driver predicted on the basis of the degree of fatigue calculated, and the recovery ability total evaluation processing is terminated.

Figure 13:
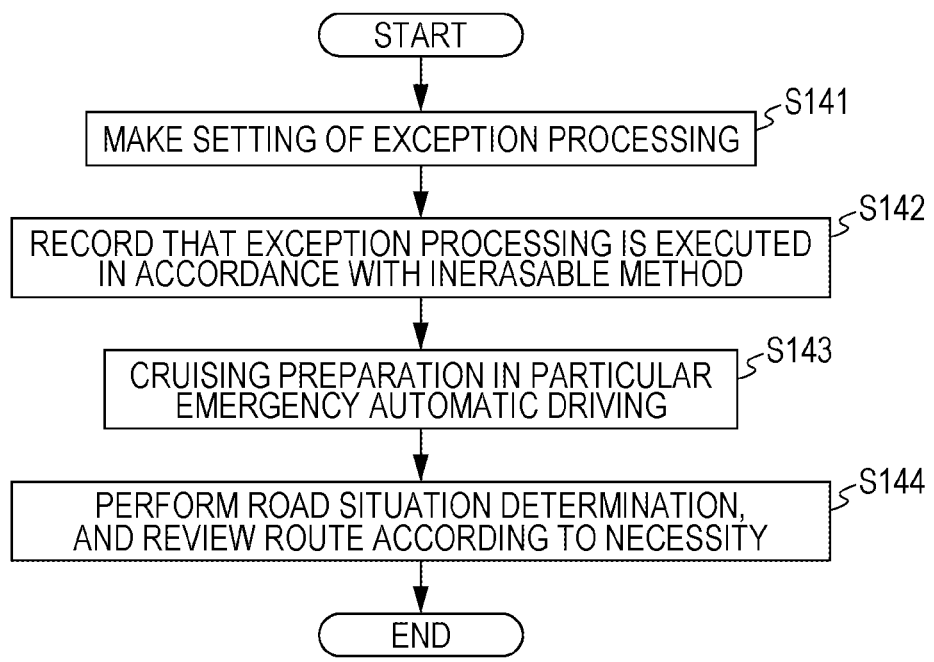
FIG. 13 is a flowchart for explaining emergency evacuation mode start processing.

Subsequently, FIG. 13 is a flowchart for explaining emergency evacuation mode start processing in step S111 of FIG. 10.

In step S141, even in a case where a driver's driving ability defect is observed, there is a possibility of a state of emergency, and therefore, the automatic driving controller 154 makes setting necessary to execute exception processing that exceptionally enables autonomous driving. For example, the automatic driving controller 154 sets a suppressed upper limit speed for performing particular emergency automatic driving that is more greatly suppressed than the upper limit speed in ordinary automatic driving.

In step S142, the automatic driving controller 154 records that the exception processing is expected in accordance with an inerasable method. By performing such recording, for example, it is possible to prevent the driver from performing misuse by continuously performing exception processing in terms of institution and operation.

In step S143, the automatic driving controller 154 performs cruising preparation in particular emergency automatic driving. For example, in this case, the driver may not be able to take measures during emergency situation and at the end of the automatic lane driving, and therefore, for example, the automatic driving controller 154 performs the cruising preparation by changing the restriction during the automatic driving and changing the degree of priority of the route path in which the vehicle can drive more safely even if the driver intervention is low. There is risk that the driver may not be able to take appropriate measures when some kind of abnormal situation occurs during automatic driving, and therefore, the automatic driving controller 154 performs the cruising preparation for changing the driving upper limit speed and the brake characteristics when the automatic driving is executed.

In step S144, the automatic driving controller 154 performs the road situation determination, reviews the route according to necessity, and then terminates the emergency evacuation mode start processing.

As explained with reference to FIGS. 10 to 13, the automatic driving control system 101 performs processing necessary to start the automatic driving. Thereafter, when the vehicle enters into the automatic driving lane, the automatic driving is started. Then, in order to predict a time when the automatic driving is terminated and the vehicle is switched to the manual driving and notify the time to the driver, the automatic driving controller 154 can perform the automatic driving termination prediction processing to derive the predicted time at which the automatic driving ends.

Figure 14:
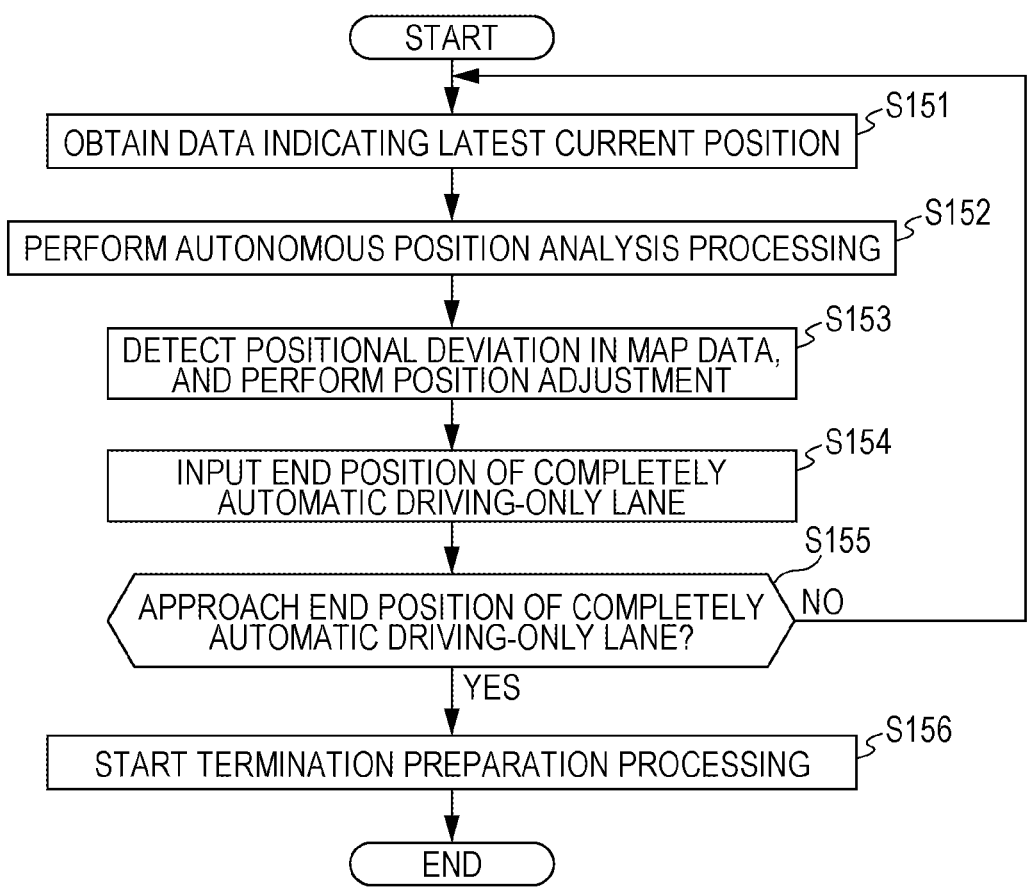
FIG. 14 is a flowchart for explaining automatic driving termination prediction processing.

Subsequently, FIG. 14 is a flowchart for explaining automatic driving termination prediction processing.

For example, in step S151, the automatic driving controller 154 obtains data indicating the latest current position measured by the measurement device 122.

In step S152, the automatic driving controller 154 performs autonomous position analysis processing for deriving the current position from the movement of the autonomous driving on the basis of the acceleration and the angular speed of the vehicle detected by an acceleration sensor, not shown, and the gyro sensor 123 and the travel distance measured by an odometer, not shown. When the reception sensitivity is good, this is not limited to the autonomous position analysis processing, and it may also be possible to obtain the current location from a GNSS, not shown, and the like.

In step S153, the automatic driving controller 154 detects a positional deviation in the map data with respect to the current position derived in steps S151 and 152, and performs position adjustment for identifying the current position on the map data (registration analysis).

In step S154, the automatic driving controller 154 inputs the end position of the completely automatic driving-only lane during driving on the basis of the selected route.

In step S155, the automatic driving controller 154 determines whether the vehicle approaches the end position of the completely automatic driving-only lane which is input in step S154 on the basis of the current position identified in step S153.

In step S155, in a case where the automatic driving controller 154 determines that the vehicle is not approaching the end position of the completely automatic driving-only lane, the processing in step S151 is performed again, and thereafter, the same processing is repeated.

On the other hand, in a case where the automatic driving controller 154 determines that the vehicle is approaching the end position of the completely automatic driving-only lane in step S155, the processing in step S156 is subsequently performed. In step S156, the automatic driving controller 154 starts the termination preparation processing for preparing the termination of the automatic driving which involves switching from the automatic driving to the manual driving, and terminates the automatic driving termination prediction processing.

As described above, automatic driving controller 154 monitors the detailed timing for starting the termination preparation processing for preparing the termination of the automatic driving on the basis of the current location data before the predicted arrival time of the completely automatic driving lane. Then, the termination preparation processing is started when it is less than a predetermined setting time at which the vehicle arrives at the end position of the completely automatic driving-only lane.

Figure 15:
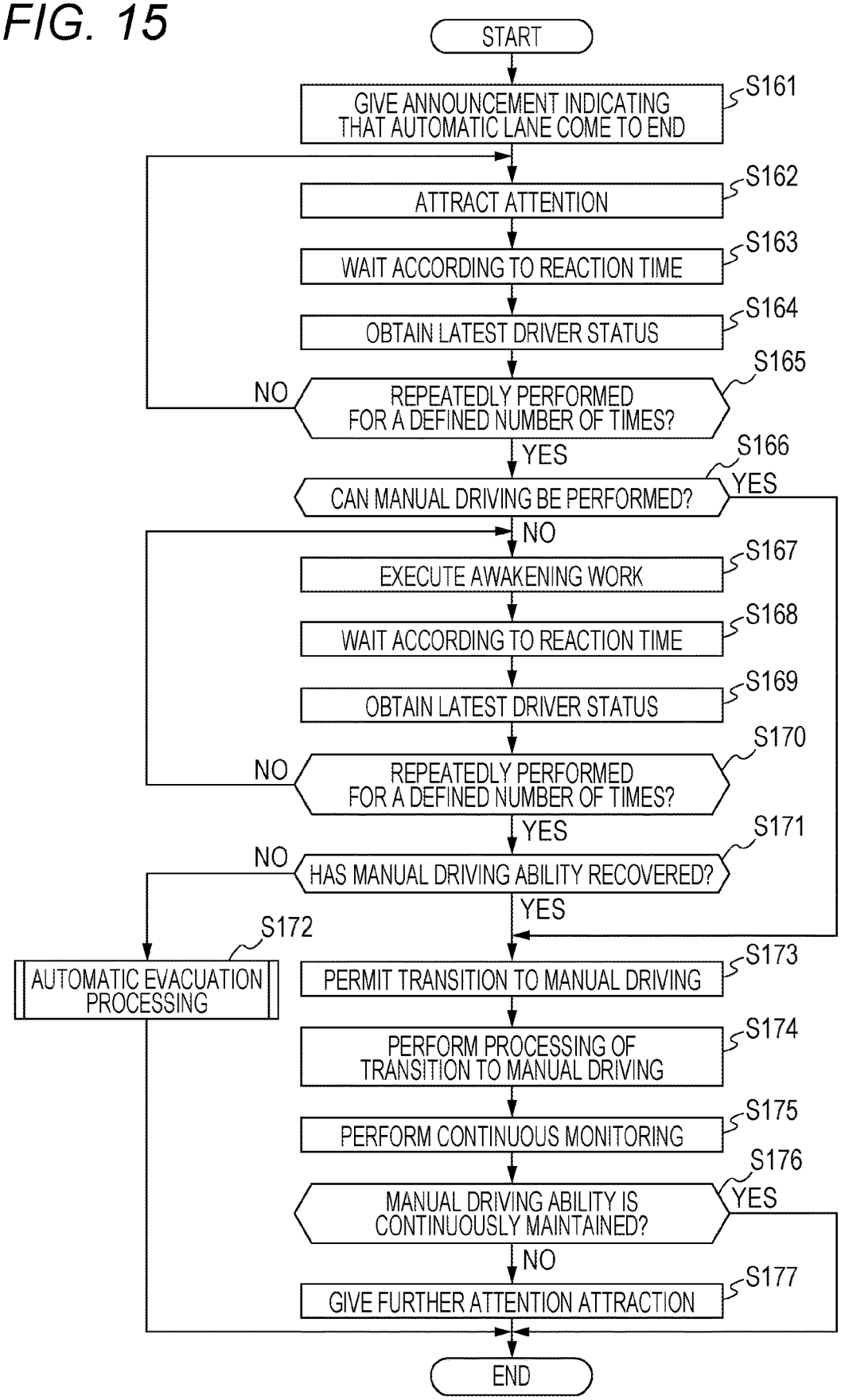
FIG. 15 is a flowchart for explaining termination preparation processing.

Subsequently, FIG. 15 is a flowchart for explaining termination preparation processing.

In step S161, the driver status determination unit 153 gives the driver an announcement indicating that the completely automatic driving-only lane comes to the end by, for example, outputting sound. By using methods other than outputting sound, the fact that the completely automatic driving-only lane comes to the end may be clearly notified to the driver by displaying, for example, a message on a display and turning on a lamp.

In step S162, the driver status determination unit 153 attracts attention to tell the driver that the completely automatic driving-only lane comes to the end to such a degree that the driver does not feel unpleasant.

In step S163, the driver status determination unit 153 waits for a time which the driver needs to respond to the attention given in step S162, and performs the processing of the determination.

In step S164, the driver status determination unit 153 obtains the latest driver status on the basis of the monitor result provided from the driver monitor device 127 and the analysis result provided from the driving behavior analysis unit 152.

In step S165, the driver status determination unit 153 determines whether the attention attraction to such a degree that the driver does not feel unpleasant is repeatedly performed for a defined number of times.

In a case where the attention attraction is not performed for the defined number of times in step S165, the processing in step S162 is performed again, and the processing is repeatedly performed until it is performed the defined number of times. Then, when the attention attraction is performed for the defined number of times in step S165, the processing in step S166 is subsequently performed.

In step S166, the driver status determination unit 153 determines whether the awakening recovery of the driver is sufficient, and the driver can perform the manual driving or not, on the basis of the latest driver status obtained in step S164. In a case where the driver status determination unit 153 determines that the driver may not perform the manual driving in step S166, the processing in step S167 is subsequently performed.

In step S167, the driver status determination unit 153 executes the awakening work for urging the driver to be awakened. For example, in the awakening work, for the purpose of urging the driver to be awakened, more unpleasant alarm than the attention attraction in step S162 (termination warning) may be output, or more highly intense haptic feedback is given.

In step S168, the driver status determination unit 153 holds the processing in the waiting state in accordance with a response time which the driver needs to respond to the awakening work in step S167.

In step S169, the driver status determination unit 153 obtains the latest driver status on the basis of the monitor result provided from the driver monitor device 127 and the analysis result provided from the driving behavior analysis unit 152.

In step S170, the driver status determination unit 153 determines whether the awakening work for urging the driver to be awakened is repeatedly performed for the defined number of times or not.

In a case where the awakening work for urging the driver to be awakened is determined not to have been repeatedly performed for the defined number of times in step S170, the processing in step S167 is performed again, and the processing is repeatedly performed until it is performed for the defined number of times. Then, when the awakening work for urging the driver to be awakened is determined to have been repeatedly performed for the defined number of times in step S170, the processing in step S171 is subsequently performed.

In step S171, the driver status determination unit 153 determines whether the driving ability has recovered to such a level that the driver can perform the manual driving on the basis of the latest driver status obtained in step S169.

In a case where the driver status determination unit 153 determines that the driving ability has not recovered to such a level that the driver can perform the manual driving in step S171, the processing in step S172 is subsequently performed. In step S172, the driver status determination unit 153 notifies the automatic driving controller 154 that the driver may not perform the manual driving, and the automatic driving controller 154 executes the automatic evacuation processing (the processing in the flowchart of FIG. 16 explained later), and terminates the termination preparation processing.

On the other hand, in a case where the driver status determination unit 153 determines that the driving ability has recovered to such a level that the driver can perform the manual driving in step S171, or in a case where the driver is determined to be able to perform the manual driving in step S166, the processing in step S173 is subsequently performed.

In step S173, the automatic driving controller 154 permits seamless transition from the automatic driving lane to the manual driving of the driver.

In step S174, the automatic driving controller 154 seamlessly continues to perform processing of transition to the manual driving performed by the driver.

In step S175, the driver status determination unit 153 performs continuous monitoring of the driving situation in which the driver performs the manual driving and the response situation in which the driver responds to the ambient environment.

In step S176, the driver status determination unit 153 determines whether the driver completely recovers and the manual driving performance is continuously maintained or not. In a case where the driver status determination unit 153 determines that the manual driving performance is continuously maintained in step S176, the termination preparation processing is terminated.

On the other hand, in a case where the driver status determination unit 153 determines that the manual driving performance is not continuously maintained in step S176, the processing in step S177 is subsequently performed. More specifically, in this case, in a case where the decrease in the level of awakening of the driver is temporarily found, the automatic driving controller 154 may further perform the attention attraction and may perform processing to urge the driver to stop the vehicle or take an earlier rest in accordance with the state of the driver in step S177. Then, upon waiting for the stop and the rest carried out, the termination preparation processing is terminated. In this case, although not shown in the flowchart, step S175 is performed again as the operation of the system and the state of the driver may be continued after step S177 for further performing the attention attraction is executed. Further, the continuous driver monitoring may be performed after the vehicle once proceeds from the automatic driving to the manual driving and the sequence is terminated.

Figure 16:
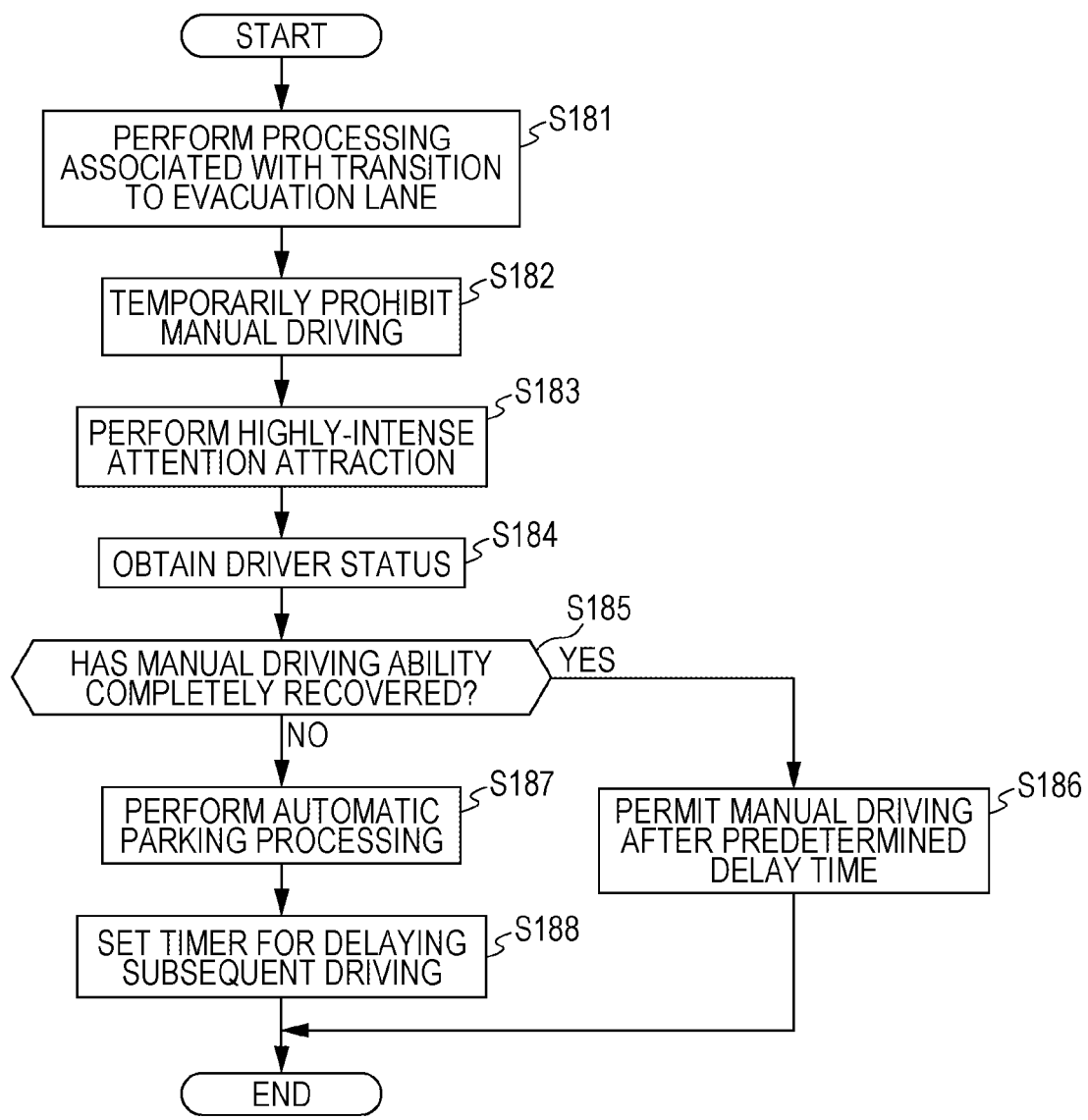
FIG. 16 is a flowchart for explaining automatic evacuation processing.

Subsequently, FIG. 16 is a flowchart for explaining the automatic evacuation processing performed in step S172 of FIG. 15.

In step S181, for example, as the processing associated with transition to the evacuation lane, the automatic driving controller 154 flashes the hazard flasher in order to notify vehicles driving behind that the automatic evacuation processing is being executed.

For example, when each of the right and left direction indicator lamps is constituted by arranging at least three light sources side by side as shown in FIG. 17, the automatic driving controller 154 instructs the lamp control unit 131 to control the hazard flasher to flash in such order that the light sources are successively turned on in the radiation direction. With such visual means of the successive illumination method, enlarging illusion can be induced and the approaching illusion effect can be given to the driver of a vehicle driving behind, and therefore, the driver can take measures and do preparation earlier.

In step S182, the automatic driving controller 154 performs the automatic driving to cause to the vehicle to proceed to the evacuation lane, and temporarily prohibits the manual driving other than soft braking by the driver. Therefore, this can prevent occurrence of an accident that is expected when the driver forcibly performs the manual driving.

In step S183, the automatic driving controller 154 performs highly intense attention attraction to such a degree that the driver feels unpleasant. For example, the automatic driving controller 154 performs highly intense attention attraction by giving an instruction to the brake activation device 129 so as to rapidly decelerate or applying seat vibration haptics input and the like. As described above, when the evacuation retraction driving with the automatic driving is started in a case where the manual driving recovery of the driver is not performed, highly intense attention attraction is performed, so that the driver feels unpleasant, and therefore, a psychological process is acted on the driver to put priority on seamless transition to manual cruising in a conscious manner in order to avoid unpleasant feeling, and it is expected to produce an effect of increasing vehicles recovering back to the manual driving in a preferential manner.

In step S184, the driver status determination unit 153 obtains the driver status in response to highly intense attention attraction on the basis of the monitor result provided from the driver monitor device 127 and the analysis result provided from the driving behavior analysis unit 152.

In step S185, the driver status determination unit 153 determines whether the manual driving performance of the driver has been completely recovered by the highly intense attention attraction.

In a case where the driver status determination unit 153 determines that the manual driving performance of the driver has been completely recovered in step S185, the processing in step S186 is subsequently performed. In step S186, the automatic driving controller 154 permits the manual driving after a predetermined delay time, and, for example, permits the manual driving from getting out of an evacuation parking place, and terminates the automatic evacuation processing.

On the other hand, in a case where the driver status determination unit 153 determines that the manual driving performance of the driver has not yet been completely recovered in step S185, the processing in step S187 is subsequently performed, and the automatic driving controller 154 performs automatic parking processing. In the automatic parking processing, for example, the automatic driving controller 154 proceeds to the evacuation lane with the automatic driving, searches a vacant parking space in the parking lot, and stops the vehicle in the desired parking space with the automatic guidance. For example, in the evacuation parking zone and the end position of the completely automatic driving-only lane, the evacuation vehicle may line up continuously, and therefore, an evacuation slow down entry vehicle approaches and evacuates from the main lane of the completely automatic driving-only lane, and thereafter the evacuation slow down entry vehicle performs the automatic cruising to the desired parking space and stops there.

In step S188, the automatic driving controller 154 sets a timer for delaying the subsequent driving in accordance with the time which the driver needs to completely recover the manual driving performance, and terminates the automatic evacuation processing. If there is a mechanism to lock the continuous cruising of the vehicle as a penalty until the driver is ready to restart from the evacuation parking lot in a case where the consciousness level decreases and the vehicle automatically makes an emergency evacuation parking, a psychological process also works here for the driver to seamlessly select the manual continuous cruising by avoiding the automatic evacuation. The degree of tolerance to the preventive function of such delay timer of the driver may be tolerated by some people or may not be tolerated by other people because of cultural factors. Therefore, the delay setting based on the timer is preferably incorporated with a mechanism of variable setting according to the sales market of vehicles. On the other hand, the driver may try to forcibly proceed to the manual driving because of insufficient driving ability in order to avoid the subsequent driving delay due to this penalty, and therefore, a limited restriction is preferably applied to handover of the authority to the driver related to the driving in the automatic parking transition time period from the highly intense attention attraction, and thus the handover may be performed.

In this case, when a determination is made as to whether the driver is in such a awakened state that the driver can drive normally, the illuminated sign is used as the target of the line of sight of the driver as explained above with reference to FIG. 8, but in addition, it may also be possible to use, for example, a dummy target as the target of the line of sight of the driver. More specifically, the dummy target which is the target of the line of sight of the driver may be displayed on the head-up display 134, and the line of sight of the driver may be tracked, so that a determination is made as to whether the driver has a manual driving performance or not.

Figure 18:
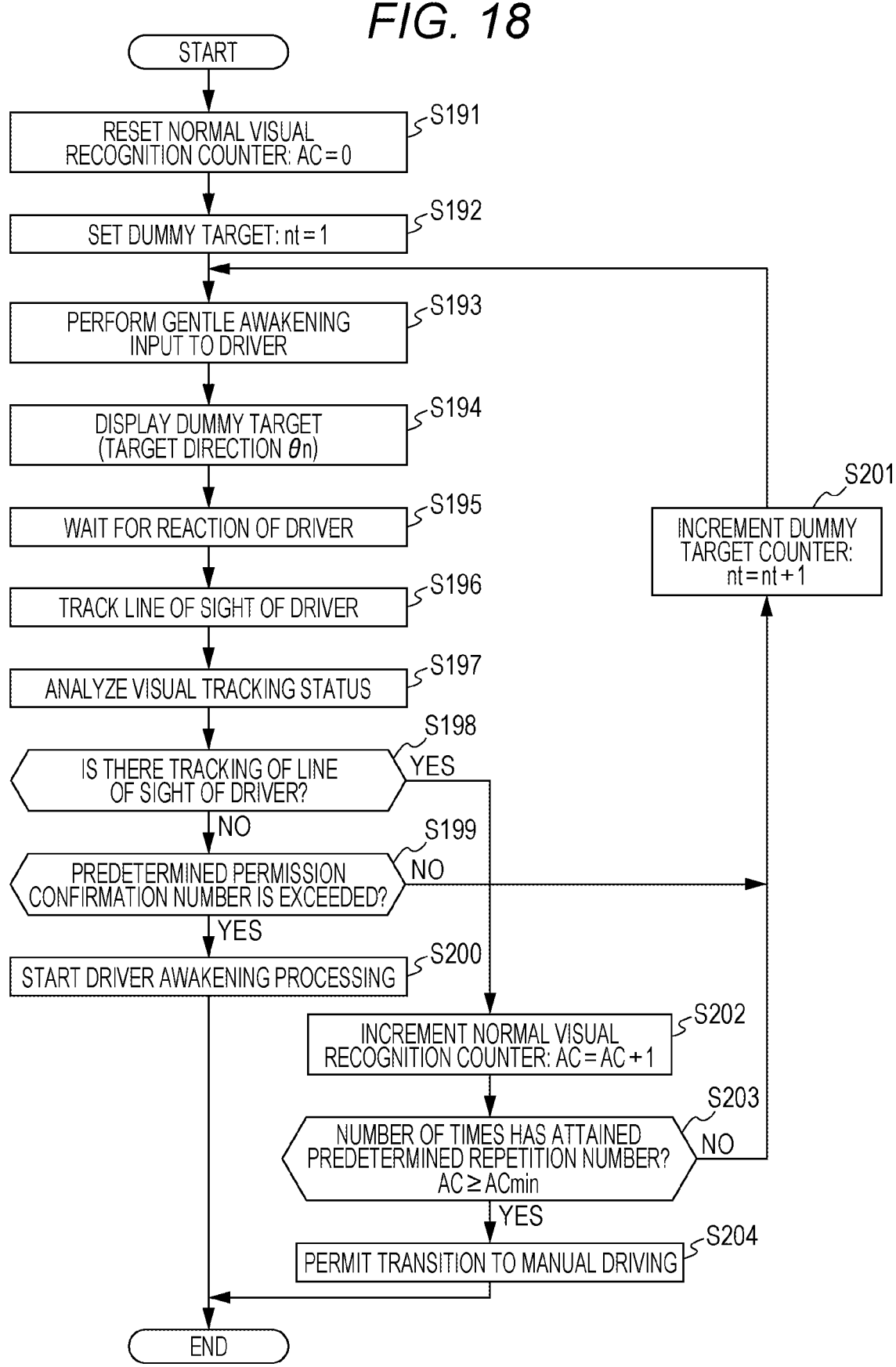
FIG. 18 is a flowchart for explaining manual driving performance determination processing.

Subsequently, FIG. 18 is a flowchart for explaining manual driving performance determination processing for determining whether the driver has the manual driving performance or not.

In step S191, the driver status determination unit 153 resets a normal visual recognition counter AC (Acknowledge Counter), which counts the number of times the driver normally visually recognizes the dummy target (AC=0).

In step S192, the driver status determination unit 153 makes a setting for displaying a dummy target on the head-up display 134, and sets a dummy target counter nt for measuring the number of times the dummy target is displayed (nt=1).

In step S193, the driver status determination unit 153 performs gentle awakening input into the driver by using, for example, seat vibration, steering percussion, attention attraction warning, and the like.

In step S194, the driver status determination unit 153 displays, on the head-up display 134, a dummy target for determining the awakening degree of the driver in such a manner that it is in a target direction $\theta n$ when seen from the driver.

In step S195, the driver status determination unit 153 keeps the processing waiting in accordance with a response time which the driver needs to respond to the dummy target displayed on the head-up display 134 in step S194.

In step S196, the driver status determination unit 153 tracks the line of sight of the driver on the basis of the monitor result provided from the driver monitor device 127.

In step S197, the driver status determination unit 153 analyzes the visual tracking status indicating the tracking state for tracking the line of sight of the driver for the dummy target displayed in the target direction $\theta n$ after the time tn.

In step S198, the driver status determination unit 153 determines whether there is a visual recognition of the driver in the target direction $\theta n$ on the basis of the tracking status analyzed in step S197.

In a case where the driver status determination unit 153 determines that there is no visual recognition of the driver in the target direction $\theta n$ in step S198, the processing in step S199 is subsequently performed.

In step S199, the driver status determination unit 153 determines whether a predetermined permission confirmation number which is set in advance is exceeded or not in order to confirm whether the driver has normally visually recognized the dummy target.

In a case where the driver status determination unit 153 determines that the predetermined permission confirmation number is exceeded in step S199, the processing in step S200 is subsequently performed. In step S200, since the driver may not normally visually recognize the dummy target and is not in the awakened state, the driver status determination unit 153 starts the driver awakening processing for causing the driver to be awakened (FIG. 19), and terminates the manual driving performance determination processing.

On the other hand, in a case where the driver status determination unit 153 determines that the predetermined permission confirmation number is not exceeded in step S199, the processing in step S201 is subsequently performed. In step S201, the driver status determination unit 153 increments the dummy target counter nt (nt=nt+1), and the processing in step S193 is performed again, and thereafter, the same processing is repeated.

On the other hand, in a case where the driver status determination unit 153 determines that there is a visual recognition of the driver in the target direction θn in step S198, the processing in step S202 is subsequently performed. In step S202, the driver status determination unit 153 increments the normal visual recognition counter AC (AC=AC+1).

In step S203, the driver status determination unit 153 determines whether the number of times the visual recognition of the driver in the target direction θn is confirmed attains a predetermined repetition number (ACmin) at which the driver can be determined to be surely awakened (AC≥AC min).

In a case where the driver status determination unit 153 determines that the number of times the visual recognition of the driver in the target direction θn is confirmed has not attained the predetermined repetition number in step S203, the processing in step S201 is subsequently performed, and the dummy target counter nt is incremented, and thereafter, the processing in step S193 is performed again.

On the other hand, in a case where the driver status determination unit 153 determines that the number of times the visual recognition of the driver in the target direction θn is confirmed has attained the predetermined repetition number in step S203, the processing in step S204 is subsequently performed. In step S204, the driver status determination unit 153 notifies the automatic driving controller 154 that the driver is surely awakened, and the automatic driving controller 154 permits transition to the manual driving (operation authority handover), and terminates the manual driving performance determination processing.

As described above, the automatic driving control system 101 uses the awakened state of the driver as confirmation means, and can feed the infrastructure environment or the dummy visual recognition target in the vehicle to the driver as necessary. The driver status determination unit 153 can use at least one of the units including the face, the line of sight, the dynamic analysis of the line of sight, and the like to determine the reaction situation of the driver, and can determine whether the driver makes a judgement under the awakening according to the feed information.

It should be noted that signs such as a number and a character illuminated and displayed around the road may also be used as the feed content, and the driver gives an operation feedback by make a judgement under consciousness according to the display content, and the driver status determination unit 153 determines the awakened state. Alternatively, for example, the target may be a composite element such as a numerical value, a sign, a signal, and the like, and the driver may perform acknowledgement/thinking judgment, and the awakened state can be determined on the basis of whether the acknowledgement has been performed correctly or not.

Figure 19:
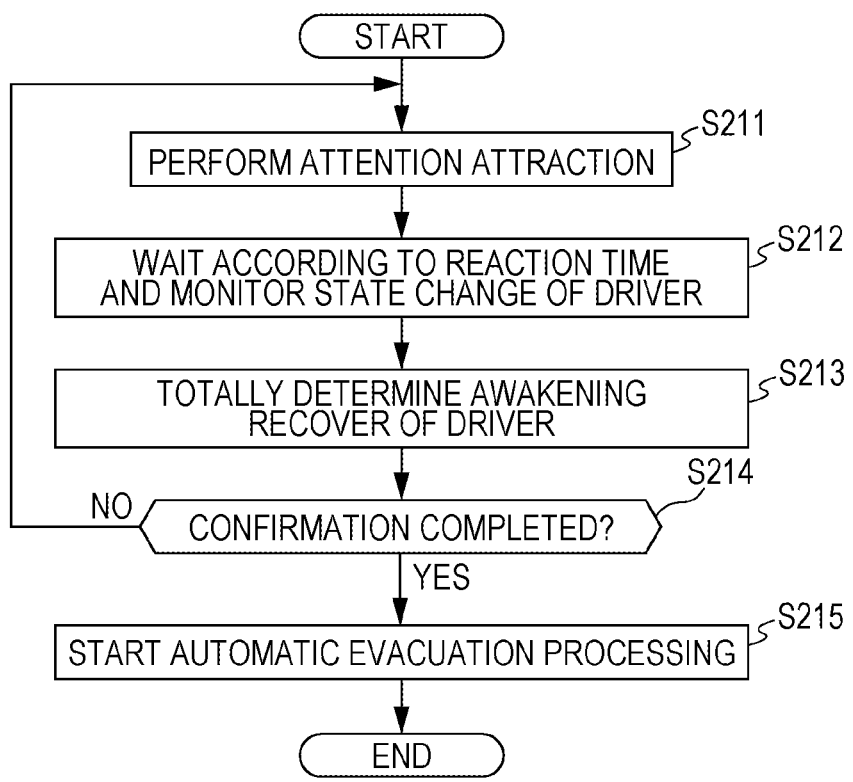
FIG. 19 is a flowchart for explaining driver awakening processing.

Subsequently, FIG. 19 is a flowchart for explaining driver awakening processing for causing the driver who may not normally visually recognize the dummy target to awakening.

In step S211, the driver status determination unit 153 performs attention attraction by, e.g., outputting a sound alarm for awakening, and driving a haptics device.

In step S212, the driver status determination unit 153 keeps the processing waiting in accordance with a reaction time which the driver needs to react to the attention attraction in step S211, and thereafter, the driver status determination unit 153 monitors the state change of the driver on the basis of the monitor result provided from the driver monitor device 127.

In step S213, the driver status determination unit 153 analyzes the stability of the line of sight of the driver, the pedal operation, the steering operation, and the like. Then, the driver status determination unit 153 totally determines whether the driver recovers back to the awakened state on the basis of the analysis result.

In step S214, the driver status determination unit 153 determines whether the confirmation as to whether the driver recovers back to the awakened state as a result of the total determination made in step S213 has been completed or not, or whether the confirmation has been performed for a predetermined number of times.

In a case where the confirmation as to whether the driver recovers back to the awakened state is determined not to have been completed or in a case where the confirmation is determined not to have been performed for a predetermined number of times in step S214, the processing in step S211 is performed again, and thereafter, the same processing is repeated.

On the other hand, in a case where the confirmation as to whether the driver recovers back to the awakened state is determined to have been completed or in a case where the confirmation is determined to have been performed for a predetermined number of times in step S214, the processing in step S215 is subsequently performed.

In step S215, the driver status determination unit 153 notifies the automatic driving controller 154 to start the automatic evacuation processing (FIG. 16), and terminates the driver awakening processing.

By the way, the automatic driving control system 101 is preferably configured to have a system configuration that can cause the vehicle to proceed to the manual driving in accordance with various situations and can cope with a situation in which the automatic evacuation is preferably performed even in locations other than the location the end of the automatic driving lane during the automatic lane driving. For example, it is difficult to carry out perfect automatic driving when expected automatic driving may not be executed due to unexpected abnormal weather, or when the road sign such as a white line necessary for the automatic driving is damaged due to an accident, or when a portion constituting the automatic driving control system 101 is broken.

In order to cope with such situation, when the automatic driving control system 101 determines that it is difficult to continue the automatic driving, the automatic driving control system 101 finds the awakened state of the driver, and when the driver is determined to have the manual driving performance, the automatic driving control system 101 proceeds from the automatic driving to the manual driving, and in a case where the driver does not have the manual driving performance, the automatic driving control system 101 performs processing to make an emergency evacuation.

Figure 20:
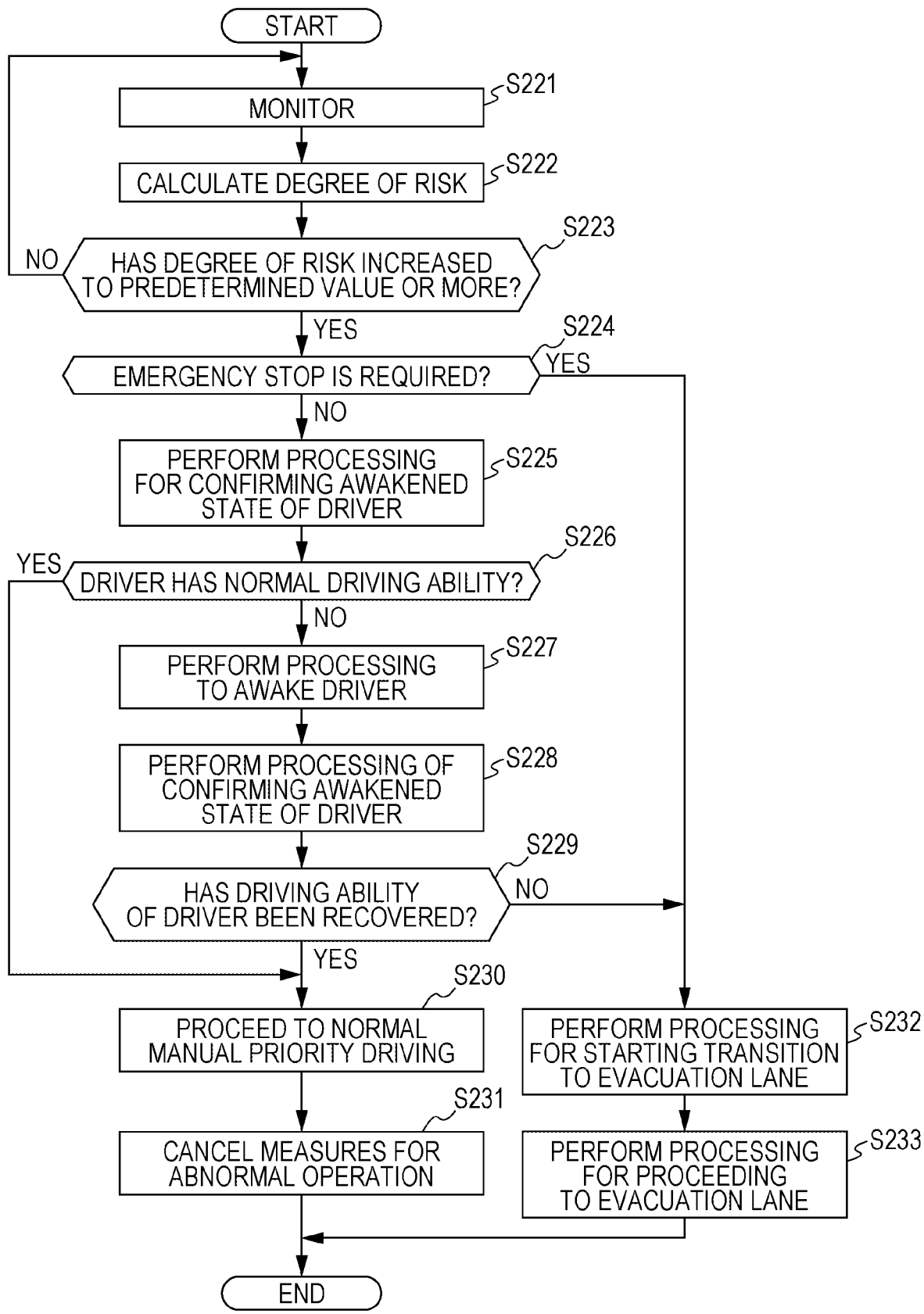
FIG. 20 is a flowchart for explaining emergency evacuation transition processing.

Subsequently, FIG. 20 is a flowchart for explaining emergency evacuation transition processing for proceeding to the emergency evacuation during normal driving.

In step S221, the automatic driving controller 154 monitors the safety risk when the automatic driving is continuously performed. For example, the automatic driving controller 154 confirms whether all the blocks constituting the automatic driving control system 101 shown in FIG. 9 operate normally, and makes a confirmation in advance before reaching the location in question to find whether there occurs an abnormality in the road environment on the driving route by communicating with an ITS (Intelligent Transport Systems) spot installed along the road via the mobile communication device 120 and the like.

In step S222, the automatic driving controller 154 calculates the degree of risk which is a degree how much the safety risk occurs due to continuation of the automatic driving, on the basis of the result of the monitoring in step S221.

In step S223, the automatic driving controller 154 determines whether the degree of risk calculated in step S222 has increased to a predetermined value or more.

In a case where the automatic driving controller 154 determines that the degree of risk calculated in step S222 has not increased to the predetermined value in step S223, the processing in step S221 is performed again, and periodical monitoring is repeatedly performed.

On the other hand, in a case where the automatic driving controller 154 determines that the degree of risk calculated in step S222 has increased to the predetermined value in step S223, the processing in step S224 is subsequently performed.

In step S224, the automatic driving controller 154 determines whether it is necessary to make an emergency stop or not. In this case, the automatic driving controller 154 immediately proceeds to the sequence S232 for stopping the vehicle when it would be too late if the awakening determination and the like of the driver is performed. In a situation where it is not necessary to immediately stop the vehicle, a judgement may be made by the driver in the manual driving.

In a case where the automatic driving controller 154 does not determine that it is necessary to make an emergency stop in step S224, the processing in step S225 is subsequently performed. In step S225, the driver status determination unit 153 performs processing for confirming the awakened state of the driver (for example, like the manual driving performance determination processing of FIG. 18, processing for tracking the line of sight for the dummy target).

In step S226, the driver status determination unit 153 determines whether the driver has normal driving ability or not as a result of the awakened state of the driver confirmed in step S225. In a case where the driver status determination unit 153 determines whether the driver does not have normal driving ability in step S226, the processing in step S227 is subsequently performed.

In step S227, the automatic driving controller 154 performs processing for awake the driver (for example, the driver awakening processing of FIG. 19). At this occasion, the automatic driving controller 154 makes a setting for taking a measure against abnormal operation to prevent an accident that is caused by an operation that is performed by the driver in a hurry while the driver is insufficiently understanding the situation (for example, making a sharp turn or a harsh braking immediately after the driver wakes up).

In step S228, the driver status determination unit 153 performs the processing for confirming the awakened state of the driver like step S225.

In step S229, the driver status determination unit 153 determines whether the driving ability of the driver has recovered or not as a result of the confirmation of the awakened state of the driver in step S228. In a case where the driver status determination unit 153 determines that the driving ability of the driver has recovered in step S229, the processing in step S230 is subsequently performed. In a case where the driver is determined to have normal driving ability in step S226, the processing in step S230 is subsequently performed.

In step S230, the automatic driving controller 154 terminates the automatic driving, and proceeds to the normal manual priority driving.

In step S231, the automatic driving controller 154 confirms that the awakened state of the driver has been ensured, and thereafter, the automatic driving controller 154 cancels the measures for the abnormal operation that is set in step S227, and terminates the emergency evacuation transition processing.

On the other hand, in a case where it is determined that it is necessary to make an emergency stop in step S224, or, in a case where the driving ability of the driver is determined not to have been recovered in step S229, the processing in step S232 is subsequently performed.

In step S232, as the processing for starting transition to the evacuation lane, for example, the automatic driving controller 154 flashes the direction indicator lamps in the direction of the evacuation lane, and performs flashing of the hazard flasher to notify vehicles driving behind that the automatic evacuation processing is being executed.

In step S233, the automatic driving controller 154 performs processing to proceed to the evacuation lane at the shoulder of the road. In a road situation in which the vehicle may not proceed to the evacuation lane, the automatic driving controller 154 decelerates and thereafter stops the vehicle. After the processing in step S233, the emergency evacuation transition processing is terminated.

Hereinafter, the active monitoring performed by the driver status determination unit 153 to monitor the response characteristics evaluation of the driver in the processing for confirming the awakened state of the driver in steps S225 and S228 of FIG. 20 will be hereinafter explained with reference to FIGS. 21A and 21B.

FIG. 21A illustrates an operation delay in the normal state of the driver. FIG. 21B illustrates an operation delay caused by the decrease in the level of awakening of the driver.

For example, while the vehicle drives in a section in which driving operation such as turning the steering is frequently necessary, the awakening determination of the driver can be done in a passive manner by checking the stability of the correction of steering when the driver correctly turns the steering along the curve of the road. In contrast, in a case where the driver does not need to intervene because of continuous cruising on a straight and flat road, it is necessary to give certain input corresponding to a response request from the vehicle system side to the driver in order to determine the awakened state of the driver.

Therefore, the automatic driving control system 101 gives an awakening vibration and a warning sound to the driver and measures response characteristics of the driver, so that there occurs a delay and a loss of reaction response of the driver in response to an active input from the system when the consciousness level is lower as shown in FIG. 21B in contrast to the delay that occurs in the awakened state as shown in FIG. 21A.

As described above, the automatic driving control system 101 monitors the response characteristics evaluation of the driver according to the active method, and measures the response delay at that occasion, the braking of the vehicle can be strengthened in accordance with the measurement value. More specifically, in the automatic driving control system 101, it is necessary to perform assistance intervention to braking of the vehicle in a case where there occurs a delay in the response characteristics as a result of the measurement and the monitoring of the response characteristics of the driver as shown in FIGS. 21A and 21B.

Figure 22:
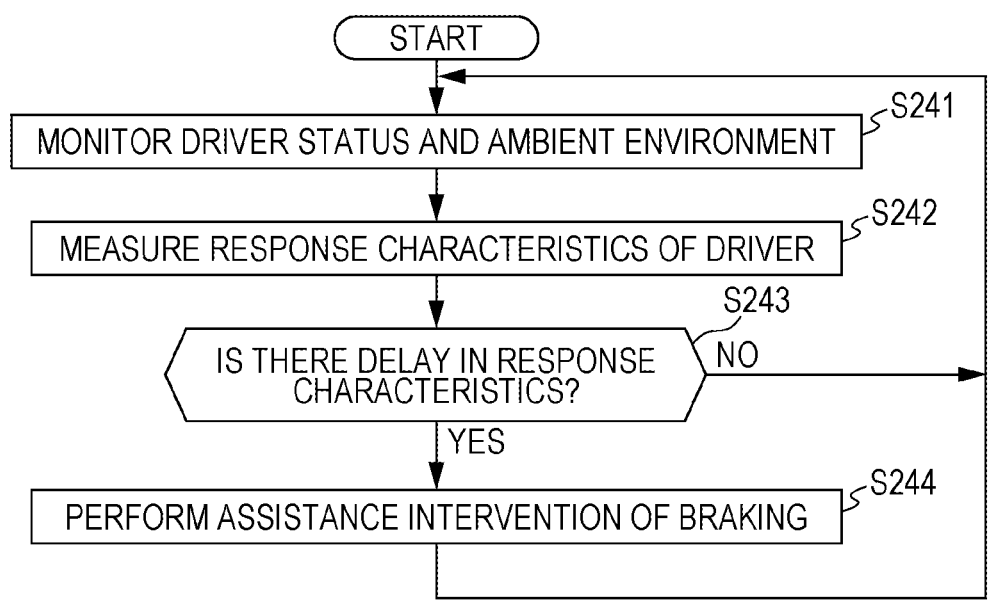
FIG. 22 is a flowchart for explaining brake assistance intervention processing.

FIG. 22 is a flowchart for explaining brake assistance intervention processing for performing giving assistance intervention to braking of the vehicle.

In step S241, the driver status determination unit 153 monitors the driver status on the basis of the monitor result provided from the driver monitor device 127 and the analysis result provided from the driving behavior analysis unit 152. The automatic driving controller 154 monitors the ambient environment on the basis of the inputs of various kinds of sensors.

In step S242, the driver status determination unit 153 measures the response characteristics of the driver. More specifically, the driver status determination unit 153 causes inputs of an awakening vibration and a warning sound explained with reference to FIGS. 21A and 21B, and the driving behavior analysis unit 152 measures and monitors the response characteristics, the operation stability, and the like detected by the acceleration operation detection unit 124, the brake operation detection unit 125, and the steering operation detection unit 126.

In step S243, the driver status determination unit 153 determines whether there occurs a delay in the response characteristics or not as compared with a necessary time in the normal preferable awakened state as shown in FIG. 21A.

In a case where the driver status determination unit 153 determines that there does not occur any delay in the response characteristics in step S243, the driver is in a preferable awakened state, and the processing in step S241 is performed again, and thereafter, the same processing is repeated.

On the other hand, in a case where the driver status determination unit 153 determines that there occurs a delay in the response characteristics in step S243, the processing in step S244 is subsequently performed. In this case, the driver is not in a preferable awakened state, and therefore, in step S244, the driver status determination unit 153 performs the assistance intervention of braking in order to compensate for the reaction delay of the driver, and, for example, the driver status determination unit 153 performs adjustment of brake control parameters of the brake activation device 129 necessary to reduce the braking time in response to the brake operation.

As described above, the automatic driving control system 101 can perform the assistance intervention of braking in a case where there occurs a delay as compared with the statistical value obtained from learning of the driver-specific characteristics of the operation in the normal preferable awakened state from the transition of the awakened state of the driver.

Subsequently, the processing for predicting a predicted time at which switching to the manual driving occurs will be explained with reference to FIG. 23.

Figure 23:
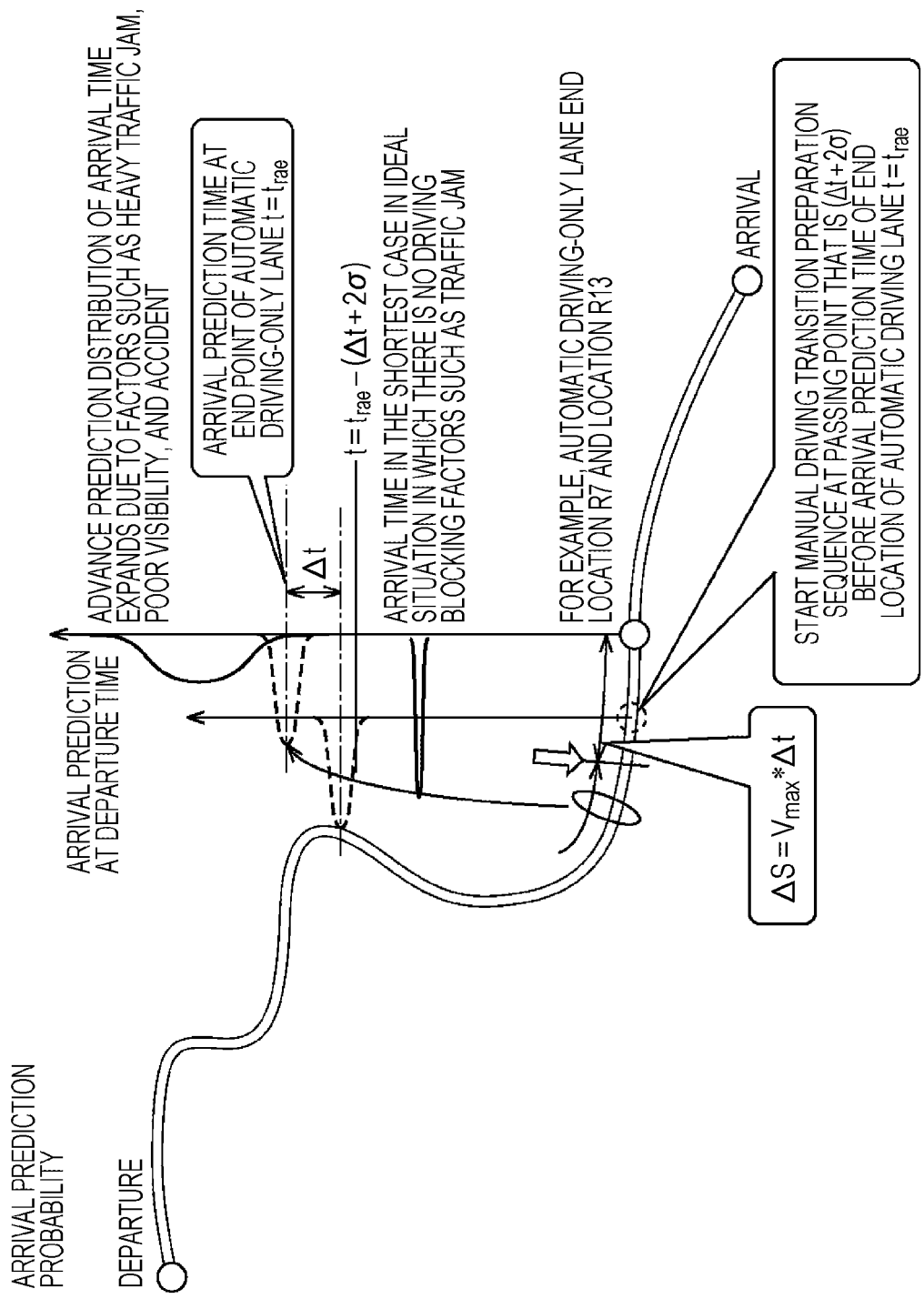
FIG. 23 is a figure for explaining processing for predicting a predicted time when switching to a manual driving occurs.

As shown in FIG. 23, there is an automatic driving-only lane from the departure location to the destination location, and arrival prediction probability for predicting the time at which the vehicle arrives at the end position (for example, before the location R7 and the location R13 of FIG. 3) will be explained.

For example, in order to allow the vehicle to smoothly enter into the manual driving section from the autonomous automatic driving-only lane, the driver needs to be awakened until the driver can sufficiently and correctly recognize the ambient situation. In order to do this, a location where the vehicle drives a certain period of time before the vehicle arrives at the end point of the section is predicted, and it is necessary to determine the awakening recovery state of the driver until the vehicle arrives at that location, and as necessary, it is necessary to awake the driver.

For example, if there occurs a possibility of delay in recognizing the ambient situation due to the awakened state and execution of another work, the automatic driving controller 154 needs to take measures such as automatic evacuation operation and deceleration. More specifically, transition to the manual driving lane while the recovery preparation of the driver of the autonomous automatic driving vehicle is not ready at a predicted time at which the automatic driving-only lane section is predicted to come to the end may result in a very dangerous situation because the manual driving road ahead may not necessarily have an environment suitable for the autonomous driving.

Therefore, it is necessary to correctly and previously find the end position of the automatic driving-only lane section or the time at which the vehicle arrives at the transition plan location to the manual lane, and it is necessary to have a preparation time period for causing the driver to proceed to the manual driving. More specifically, it is necessary to start the manual driving transition preparation sequence a certain period of time Δt before the vehicle arrives at the location R7 (FIG. 3) where the vehicle proceeds from the end position of the automatic driving-only lane section to the manual driving section or the period of time Δt before the vehicle enters into the location R13 (FIG. 3) where the vehicle proceeds from the autonomous automatic driving lane to the manual lane.

At the driving location where the vehicle drives the period of time before the end position of the automatic driving-only lane section, the point of the transition preparation sequence can be designated with a sign on the road and a road sign and further the fixed passing point with DSRC and the like as a road infrastructure (infrastructure). In a case of such a fixed constant point coordinate, the vehicle may pass that section of the road at a speed as high as the driving-permitted maximum speed $V_{max}$, and the vehicle may arrive at the location R7 at a time Δt later, and therefore, this is a location before the transition location by a travel distance ($V_{max}*\Delta t$).

For example, when the period of time is defined as five minutes, and the speed 80 Km/h is the maximum speed allowed for the automatic driving, the location 6.7 Km before the actual end of the dedicated lane termination is the manual driving transition preparation location. However, depending on the degree of congestion of the road, the actual driving speed is, for example, 20 km/h which is one fourth of the maximum speed, and it takes a time four times longer, and in a case where a notification is received 6.7 Km before, the manual driving transition preparation is started 20 minutes before in reality because it takes a time four times longer.

In addition, the driving speed on the road changes dynamically due to traffic jam and the like, and therefore, even if the previous awakening destination location is set, it may change greatly from the actual time. In such case, when the actual timing necessary for recovery of the driver is too much delayed, the driver may be feel relieved by the situation, and the level of awakening may decrease, which results in the opposite effect, and therefore, it is preferable to proceed to the manual driving preparation sequence at a previous time that is somewhat accurate. On a route and the like where there is typically traffic jam, it may be unpleasant for the driver, and therefore, it may be preferable to perform the manual driving preparation transition sequence a certain time Δt before, regardless of the entire flow of the road.

Further, in the autonomous automatic driving lane, there may be an exit at an unspecified location, and many such locations R13 (FIG. 3) for proceeding to the manual lane may be provided frequently in a single continuous autonomous automatic driving-only lane. Therefore, it may not be said to be a very desirable configuration to arrange exit markers for all of them and apply the manual driving preparation transition sequence not only from the view point of the infrastructure maintenance but also from the view point of the installation and long-term maintenance. Therefore, the vehicle preferably includes the manual driving preparation transition sequence with autonomous determination even if external information is obtained by some other means. By doing so, a marker or a sign for each exit on the way is not necessary, and it is sufficient to provide a single driving preparation transition sequence start marker sign at a single location of the ultimate end position of the single continuous autonomous automatic driving-only lane section, and this greatly reduces the burden as the infrastructure maintenance, so that the barrier for the introduction is reduced. Then, it is preferable for each vehicle to perform the destination location arrival prediction in the driving environment and the driving of the vehicle in an autonomous manner depending on the purposes, and start autonomously the manual driving preparation transition sequence from the autonomous automatic driving at an appropriate point without depending on the infrastructure installation marker.

For example, in the commuting route and the like, a particular location which is a daily used road environment is recorded and saved, and a previous preparation point of the manual driving is defined in advance without fail, so that even if the drive temporarily becomes sleepy and the environment recognition is interrupted, awakening is started in the same familiar environment by fixing a certain location designated and set by the driver in advance, and it is expected to smoothly perform the recognition of the situation again. In a case where the driver makes a custom setting in advance, the driver may try to set the installation of a location as close as possible to the manual driving transition location because the driver has a mentality of wishing to take an easy course, which is dangerous. Therefore, the setting of the start location of the manual driving preparation transition sequence is preferably limited to, for example, at least one kilometer before the manual driving transition location in terms of safe operation.

In recent years, a service is provided to occasionally collect traffic data of roads from a navigation system such as a Global Navigation Satellite System (GNSS) and many driving vehicles, centrally obtain road information, and provide the road information to the subscribed vehicles from the server. Therefore, it may be possible to obtain a portion that can be calculated on the basis of the information held by the vehicle itself and broad information obtained by centrally managing the central road information.

In a use case in which the manual driving preparation transition sequence location is determined in advance, a determination is made as to whether the vehicle approaches the manual driving preparation transition sequence location from the currently driving location of the vehicle by referring to the drive history and the reference map information, and it may be possible to start the sequence at the driving point determined to pass.

On the other hand, the destination location arrival time predicted at the start of driving changes due to various factors such as the congestion situation of the road depending on the time zone and the day in the week, various weather situations on the route, an occurrence of an accident and driving affection factors, maintenance situation of the road, and the like, and the distribution of the arrival prediction probability obtained at an early stage is expanded. When approaching closer to the arrival point, the change factors also decrease, and therefore, more accurate prediction can be obtained. What is necessary for the system for appropriate operation is to start the manual driving transition preparation sequence a certain period of time $\Delta t$ before, and in such case, the vehicle may drive at the maximum permitted speed if there is no driving blocking factors at all in a case where there is no information necessary at all for change factor prediction, and therefore, at the fastest speed, the vehicle arrives at the end position of the automatic driving-only lane after the vehicle drives in the section of $\Delta S = V_{max} * \Delta t$.

More specifically, if the latest arrival prediction probability distribution can be obtained at the location with $\Delta S$, the more appropriate arrival time of the end position of the automatic driving-only lane changes, and where the updated arrival prediction time obtained again is defined as $t_{rae}$ (renew arrival estimation), it is possible to sufficiently ensure a time for proceeding with the manual driving transition procedure for the driver to such a degree that a large problem does not occur even though a change factor remains if the manual driving transition preparation sequence is started at a point in time that is a certain period of time $\Delta t$ before the arrival prediction time and further $2\sigma$ before that.

When the increase in the predicted driving speed is detected because, e.g., the traffic jam is solved after passing $\Delta S$, the arrival time becomes earlier, and therefore, the manual driving transition preparation sequence is started earlier by a time for compensating the increase in the speed. By start at the earlier time, a measure for avoiding the delay in the transition preparation sequence can be performed even if the vehicle arrives earlier than the predicted arrival time.

The series of processing explained above (information processing method) may be executed by hardware or may be executed by software. When the series of processing is executed by the software, a program constituting the software is installed from a program recording medium having the program recorded thereon is installed to a computer incorporated into dedicated hardware and, for example, a general-purpose personal computer capable of executing various kinds of functions by installing various kinds of programs.

Figure 24:
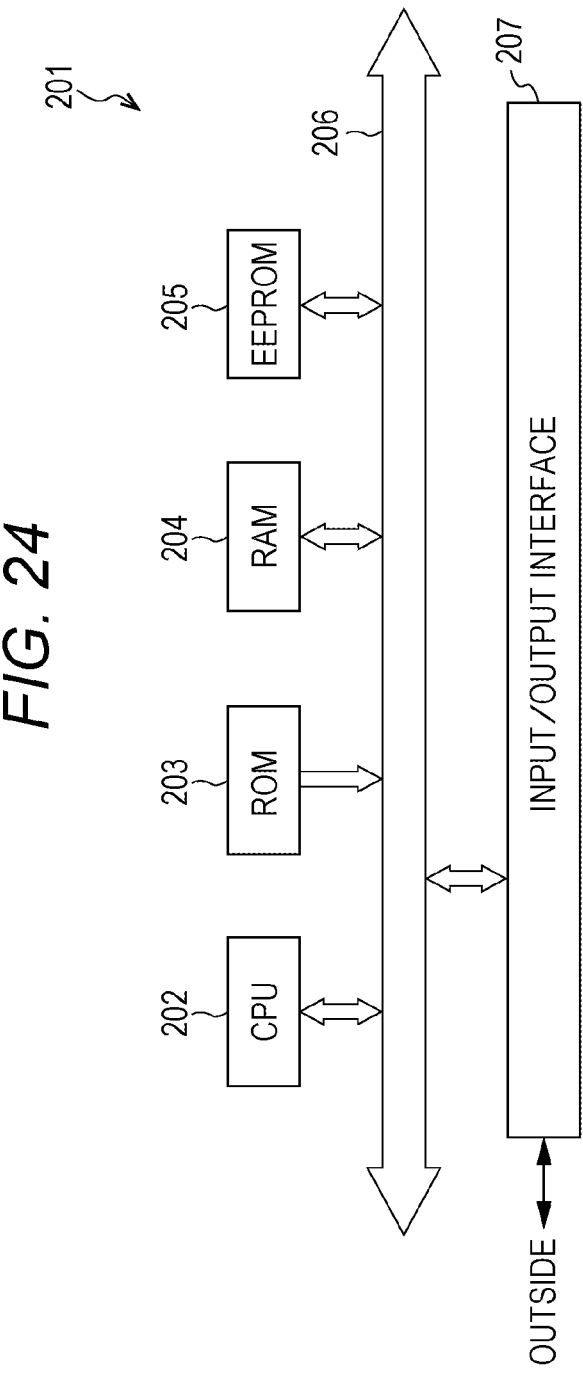
FIG. 24 is a block diagram illustrating an example of configuration of an embodiment of a computer to which the present technique is applied.

FIG. 24 is a block diagram illustrating an example of configuration of hardware of a computer executing the series of processing with the program, and/or configured to implement one or a combination of the units described above with respect to FIGS. 1 and 9.

In this computer, a CPU (Central Processing Unit) 202, a ROM (Read Only Memory) 203, a RAM (Random Access Memory) 204, and an EEPROM (Electronically Erasable and Programmable Read Only Memory) 205 are connected with each other by a bus 206. The bus 206 is further connected with an input/output interface 207, and connected to the outside via the input/output interface 207.

In the computer configured as described above, the CPU 202 performs the above series of processing by executing the program stored in the ROM 103 and the EEPROM 205 by loading the program to the RAM 203 via the bus 206.

For example, the program executed by the computer (CPU 202) may be provided by using a package medium constituted by a magnetic disk (including a flexible disk), an optical disk (a CD-ROM (Compact Disc-Read Only Memory), a DVD (Digital Versatile Disc), and the like), a magneto-optical disk, or a semiconductor memory, and the like from the outside connected via the input/output interface 207, or provided via wired or wireless transmission media such as a local area network, the Internet, and a digital satellite broadcasting.

It should be noted that the present technique may be configured as follows.

(1) A method for switching modes for operating a vehicle, the method including:

determining, by circuitry of an information processing apparatus, whether a mode for operating the vehicle is to be switched from one of autonomous and manual driving modes to the other of the autonomous and manual driving modes;

obtaining a state of a driver of the vehicle when the mode for operating the vehicle is determined to be switched; and switching, by the circuitry, the mode for operating the vehicle from the one of the autonomous and manual driving modes to the other of the autonomous manual driving modes based on the obtained state of the driver.

(2) The method of feature (1), further including:

determining an ability of a driver to drive the vehicle based on the obtained state of the driver; and switching the mode for operating the vehicle from the autonomous driving mode to the manual driving mode when the ability of the driver is determined to be greater than or equal to a predetermined level.

(3) The method of feature (2), further including:

providing a warning to the driver to change the state of the driver when the ability of the driver is determined to be less than the predetermined level; and determining the ability of the driver to drive the vehicle after the warning is provided to the driver; and switching the mode for operating the vehicle from the autonomous driving mode to the manual driving mode when the ability of the driver after the warning is provided is determined to be greater than or equal to the predetermined level.

(4) The method of feature (3), further including:

causing the vehicle to stop when the ability of the driver to drive the vehicle is determined to be less than the predetermined level.

(5) The method of any one of features (1) to (4), further including:

notifying the driver that the autonomous driving mode is to be terminated when the mode for operating the vehicle is determined to be switched from the autonomous driving mode to the manual driving mode.

(6) The method of any one of features (1) to (5), in which the step of determining includes:

determining the mode for operating the vehicle is to be switched from the autonomous driving mode to the manual driving mode based on a distance to an end of an automatic driving-only lane.

(7) The method of any one of features (1) to (6), further including:

determining whether the autonomous driving mode can be started based on the obtained state of the driver, in which the step of switching the mode includes switching the mode for operating the vehicle from the manual driving mode to the autonomous driving mode when the autonomous driving mode can be started.

(8) The method of feature (7), further including:

determining an ability of the driver to drive the vehicle based on the obtained state of the driver; and prohibiting the mode for operating the vehicle to switch from the manual driving mode to the autonomous driving mode when the ability of the driver is determined to be less than a predetermined level.

(9) The method of any one of features (1) to (8), further including:

monitoring the state of the driver and an ambient environment while the mode for operating to vehicle is in the autonomous driving mode.

(10) The method of any one of features (1) to (9), further including:

causing a plurality of content to be displayed to the driver; and monitoring a reaction of the driver to the display of the plurality of content, in which the step of obtaining includes obtaining the state of the driver based on the monitored reaction of the driver.

(11) A non-transitory computer-readable medium storing instructions which, when executed by a computer, causes the computer to perform a method for switching modes for operating a vehicle, the method including:

determining whether a mode for operating the vehicle is to be switched from one of autonomous and manual driving modes to the other of the autonomous and manual driving modes;

obtaining a state of a driver of the vehicle when the mode for operating the vehicle is determined to be switched; and switching the mode for operating the vehicle from the one of the autonomous and manual driving modes to the other of the autonomous manual driving modes based on the obtained state of the driver.

(12) The non-transitory computer-readable medium of feature (11), further including:

determining an ability of a driver to drive the vehicle based on the obtained state of the driver; and switching the mode for operating the vehicle from the autonomous driving mode to the manual driving mode when the ability of the driver is determined to be greater than or equal to a predetermined level.

(13) The non-transitory computer-readable medium of feature (12), further including:

providing a warning to the driver to change the state of the driver when the ability of the driver is determined to be less than the predetermined level; and determining the ability of the driver to drive the vehicle after the warning is provided to the driver; and switching the mode for operating the vehicle from the autonomous driving mode to the manual driving mode when the ability of the driver after the warning is provided is determined to be greater than or equal to the predetermined level.

(14) The non-transitory computer-readable medium of feature (13), further including:

causing the vehicle to stop when the ability of the driver to drive the vehicle is determined to be less than the predetermined level.

(15) The non-transitory computer-readable medium of any one of features (11) to (14), further including:

notifying the driver that the autonomous driving mode is to be terminated when the mode for operating the vehicle is determined to be switched from the autonomous driving mode to the manual driving mode.

(16) The non-transitory computer-readable medium of any one of features (11) to (15), in which the step of determining includes:

determining the mode for operating the vehicle is to be switched from the autonomous driving mode to the manual driving mode based on a distance to an end of an automatic driving-only lane.

(17) The non-transitory computer-readable medium of any one of features (11) to (16), further comprising;

determining whether the autonomous driving mode can be started based on the obtained state of the driver, in which the step of switching the mode includes switching the mode for operating the vehicle from the manual driving mode to the autonomous driving mode when the autonomous driving mode can be started.

(18) The non-transitory computer-readable medium of feature (17), further including;

determining an ability of the driver to drive the vehicle based on the obtained state of the driver; and prohibiting the mode for operating the vehicle to switch from the manual driving mode to the autonomous driving mode when the ability of the driver is determined to be less than a predetermined level.

(19) The non-transitory computer-readable medium of any one of features (11) to (18), further including;

monitoring the state of the driver and an ambient environment while the mode for operating to vehicle is in the autonomous driving mode.

(20) The non-transitory computer-readable medium of any one of features (11) to (19), further including;

causing a plurality of content to be displayed to the driver; and monitoring a reaction of the driver to the display of the plurality of content, in which the step of obtaining includes obtaining the state of the driver based on the monitored reaction of the driver.

(21) An information processing apparatus, including;

circuitry configured to determine whether a mode for operating a vehicle is to be switched from one of autonomous and manual driving modes to the other of the autonomous and manual driving modes;

obtain a state of a driver of the vehicle when the mode for operating the vehicle is determined to be switched; and switch the mode for operating the vehicle from the one of the autonomous and manual driving modes to the other of the autonomous manual driving modes based on the obtained state of the driver.

(22) The information processing apparatus of feature (21), in which the circuitry is configured to determine an ability of a driver to drive the vehicle based on the obtained state of the driver; and switch the mode for operating the vehicle from the autonomous driving mode to the manual driving mode when the ability of the driver is determined to be greater than or equal to a predetermined level.

(23) The information processing apparatus of feature (22), in which the circuitry is configured to provide a warning to the driver to change the state of the driver when the ability of the driver is determined to be less than the predetermined level;

determine the ability of the driver to drive the vehicle after the warning is provided to the driver; and switch the mode for operating the vehicle from the autonomous driving mode to the manual driving mode when the ability of the driver after the warning is provided is determined to be greater than or equal to the predetermined level.

(24) The information processing apparatus of feature (23), in which the circuitry is configured to cause the vehicle to stop when the ability of the driver to drive the vehicle is determined to be less than the predetermined level.

(25) The information processing apparatus of any one of features (21) to (24), in which the circuitry is configured to notify the driver that the autonomous driving mode is to be terminated when the mode for operating the vehicle is determined to be switched from the autonomous driving mode to the manual driving mode.

(26) The information processing apparatus of any one of features (21) to (25), in which the circuitry is configured to determine the mode for operating the vehicle is to be switched from the autonomous driving mode to the manual driving mode based on a distance to an end of an automatic driving-only lane.

(27) The information processing apparatus of any one of features (21) to (26), in which the circuitry is configured to determine whether the autonomous driving mode can be started based on the obtained state of the driver, and switch the mode for operating the vehicle from the manual driving mode to the autonomous driving mode when the autonomous driving mode can be started.

(28) The information processing apparatus of feature (27), in which the circuitry is configured to determine an ability of the driver to drive the vehicle based on the obtained state of the driver; and prohibit the mode for operating the vehicle to switch from the manual driving mode to the autonomous driving mode when the ability of the driver is determined to be less than a predetermined level.

(29) The information processing apparatus of any one of features (21) to (28), in which the circuitry is configured to monitor the state of the driver and an ambient environment while the mode for operating to vehicle is in the autonomous driving mode.

(30) The information processing apparatus of any one of features (21) to (29), in which the circuitry is configured to cause a plurality of content to be displayed to the driver;

monitor a reaction of the driver to the display of the plurality of content; and obtain the state of the driver based on the monitored reaction of the driver.

(31) An information processing apparatus, including:

means for determining whether a mode for operating a vehicle is to be switched from one of autonomous and manual driving modes to the other of the autonomous and manual driving modes;

means for obtaining a state of a driver of the vehicle when the mode for operating the vehicle is determined to be switched; and means for switching the mode for operating the vehicle from the one of the autonomous and manual driving modes to the other of the autonomous manual driving modes based on the obtained state of the driver.

(32) The information processing apparatus of feature (31), further including:

means for determining an ability of a driver to drive the vehicle based on the obtained state of the driver, in which the means for switching switches the mode for operating the vehicle from the autonomous driving mode to the manual driving mode when the ability of the driver is determined to be greater than or equal to a predetermined level.

(33) The information processing apparatus of feature (32), further including:

means for providing a warning to the driver to change the state of the driver when the ability of the driver is determined to be less than the predetermined level, in which the means for determining the ability of the driver determines the ability of the driver to drive the vehicle after the warning is provided to the driver, and the means for switching switches the mode for operating the vehicle from the autonomous driving mode to the manual driving mode when the ability of the driver after the warning is provided is determined to be greater than or equal to the predetermined level.

(34) The information processing apparatus of feature (33), further including:

means for causing the vehicle to stop when the ability of the driver to drive the vehicle is determined to be less than the predetermined level.

(35) The information processing apparatus of any one of features (31) to (34), further including:

means for notifying the driver that the autonomous driving mode is to be terminated when the mode for operating the vehicle is determined to be switched from the autonomous driving mode to the manual driving mode.

(36) The information processing apparatus of any one of features (31) to (35), in which the means for determining whether the mode for operating the vehicle is to be switched determines the mode for operating the vehicle is to be switched from the autonomous driving mode to the manual driving mode based on a distance to an end of an automatic driving-only lane.

(37) The information processing apparatus of any one of features (31) to (36), further including:

means for determining whether the autonomous driving mode can be started based on the obtained state of the driver, in which the means for switching switches the mode for operating the vehicle from the manual driving mode to the autonomous driving mode when the autonomous driving mode can be started.

(38) The information processing apparatus of feature (37), further including:

means for determining an ability of the driver to drive the vehicle based on the obtained state of the driver; and means for prohibiting the mode for operating the vehicle to switch from the manual driving mode to the autonomous driving mode when the ability of the driver is determined to be less than a predetermined level.

(39) The information processing apparatus of any one of features (31) to (38), further including:

means for monitoring the state of the driver and an ambient environment while the mode for operating to vehicle is in the autonomous driving mode.

(40) The information processing apparatus of any one of features (31) to (39), further including:

means for causing a plurality of content to be displayed to the driver; and means for monitoring a reaction of the driver to the display of the plurality of content, in which the means for obtaining obtains the state of the driver based on the monitored reaction of the driver.

It should be noted that the present technique may be configured as follows.

(1) An automatic driving control device including:

a driving execution unit configured to execute automatic driving cruising of a vehicle; and a recovery determination unit configured to determine whether a driver has driving ability capable of recovering to manual driving from automatic driving, wherein the automatic driving cruising is prohibited in a case where the recovery determination unit determines that the driver does not have the driving ability before the driving execution unit starts the automatic driving cruising of the vehicle.

(2) The automatic driving control device according to (1), wherein even when the driver's driving ability decreases, the recovery determination unit permits the driving execution unit to perform the automatic driving cruising in an emergency evacuation coping mode.

(3) The automatic driving control device according to (2), wherein the recovery determination unit includes a recording unit configured to record and save, in a non-erasable manner, that the automatic driving cruising is permitted to be performed in the emergency evacuation coping mode when the driving execution unit permits the automatic driving cruising in the emergency evacuation coping mode.

(4) The automatic driving control device according to any one of (1) through (3), wherein the recovery determination unit includes:

a monitor unit configured to monitor the driver's driving ability by using one or more of schemes including a face recognition of the driver, a head part posture recognition, a vision line direction recognition, and statistical determination processing of a head part posture or a vision line direction time lapse stability; and a determination processing unit configured to determine manual driving performance after a particular time on the basis of a monitor result of the monitor unit.

(5) An automatic driving control method for an automatic driving control device including a driving execution unit configured to execute automatic driving cruising of a vehicle and a recovery determination unit configured to determine whether a driver has driving ability capable of recovering to manual driving from automatic driving, wherein the automatic driving control method includes prohibiting the automatic driving cruising in a case where the recovery determination unit determines that the driver does not have the driving ability before the driving execution unit starts the automatic driving cruising of the vehicle.

(6) A program causing a computer, the computer being included in an automatic driving control device including a driving execution unit configured to execute automatic driving cruising of a vehicle and a recovery determination unit configured to determine whether a driver has driving ability capable of recovering to manual driving from automatic driving, to execute:

prohibiting the automatic driving cruising in a case where the recovery determination unit determines that the driver does not have the driving ability before the driving execution unit starts the automatic driving cruising of the vehicle.

The present embodiment is not limited to the above embodiment, and can be changed in various manners without deviating from the gist of the present disclosure.

REFERENCE SIGNS LIST

11 Automatic driving control device
12 Recovery determination unit
13 Driving execution unit
21 Monitor unit
22 Output unit
23 Road information obtaining unit
24 Input unit 25 Recording unit
26 Determination processing unit
31 Environment recognition unit
32 Driving processing unit
33 Steering wheel control unit
34 Speed control unit
35 Hazard flasher control unit
41 Camera

The invention claimed is:

1. An automatic driving control device comprising:
 circuitry configured to
 obtain a state of a driver of a vehicle when a mode for operating the vehicle is determined to be switched; and
 determine whether the state of the driver is sufficient for the driver to proceed with manual driving of the vehicle after vehicle recovery from automatic driving,
 wherein automatic driving cruising is prohibited in a case where the circuitry determines that the state of the driver is not sufficient to proceed with manual driving before the automatic driving cruising of the vehicle is started.

2. The automatic driving control device according to claim 1, wherein the circuitry is configured to predict a predicted time when the vehicle arrives at an end point which is an end of an automatic driving lane section in which the automatic driving cruising can be performed under control of the circuitry, and notify the driver that the automatic driving lane section comes to an end by using at least one effect selected from auditory, visual, or tactile effects a predetermined time before the vehicle arrives at the end point of the automatic driving lane section.

3. The automatic driving control device according to claim 2, wherein the circuitry is configured to notify the driver that the automatic driving lane section will come to the end at least thirty seconds before the vehicle arrives at the end point of the automatic driving lane section.

4. The automatic driving control device according to claim 2, wherein the circuitry is configured to determine an awakened state of the driver when the driver is notified that the automatic driving lane section comes to the end.

5. The automatic driving control device according to claim 4, wherein the circuitry is configured to control an urging of the driver to perform consciousness recovery by using at least one effect selected from auditory, visual, or tactile effects in accordance with the awakened state of the driver.

6. The automatic driving control device according to claim 1, wherein even when a driving ability of the driver for manual driving decreases, the circuitry is configured to perform the automatic driving cruising in an emergency evacuation coping mode.

7. The automatic driving control device according to claim 6, wherein the circuitry is configured to determine which of an automatic evacuation and a manual cruising is to be performed, in accordance with the driving ability of the driver, after an attention awareness operation is executed on the driver by carrying out sudden deceleration or input of seat vibration haptics.

8. The automatic driving control device according to claim 6, the circuitry is further configured to provide visual notification to a vehicle driving behind the vehicle while performing automatic driving cruising in the emergency evacuation coping mode.

9. The automatic driving control device according to claim 8, wherein the visual notification includes illumination of a hazard flasher of the vehicle, and when a right/left illumination method of the hazard flasher is constituted by at least three light source, the circuitry issues an order that the light sources are illuminated such that the light sources are successively turned on in a radiation direction.

10. The automatic driving control device according to claim 6, where the circuitry is configured to causes the vehicle to perform the automatic driving cruising in the emergency evacuation coping mode, and thereafter, cause the vehicle to perform automatic cruising to a parking space in a desired evacuation parking area, and thereafter cause the vehicle to stop.

11. The automatic driving control device according to claim 1, wherein even when a driving ability of the driver for manual driving decreases, the circuitry is configured to start a particular emergency automatic driving or perform continuous cruising.

12. The automatic driving control device according to claim 11, wherein when the particular emergency automatic driving is started, the circuitry executes cancellation of prohibition of the automatic cruising, and records a recording of the execution in an inerasable manner.

13. The automatic driving control device according to claim 11, wherein when the particular emergency automatic driving is performed, the circuitry sets a speed upper limit limitation which is lower than normal automatic driving.

14. The automatic driving control device according to claim 11, wherein when the particular emergency automatic driving is performed, the circuitry notifies an outside of the vehicle that the particular emergency automatic driving is performed in a visual manner.

15. The automatic driving control device according to claim 6, wherein the circuitry is configure to issue a warning to the driver coping with an occurrence of a non-regular state and guides the driver to perform manual driving transition, or in a case where a recovery of driving ability of the driver is judged by the circuitry to be insufficient, the automatic driving cruising is performed in the emergency evacuation coping mode.

16. The automatic driving control device according to claim 6, wherein the circuitry is configured to estimate that there a delay in a brake operation by the driver occurs in a case where the delay is equal to or more than a predetermined value as compared with a statistical value of vehicle operation in a normal preferable awakened state, and
 the circuitry performs correction intervention and reduces a braking time.

17. The automatic driving control device according to claim 6, wherein a recorder is configured to record and save, in a non-erasable manner, that the automatic driving cruising is permitted to be performed in the emergency evacuation coping mode when the circuitry permits the automatic driving cruising in the emergency evacuation coping mode.

18. An automatic driving control method comprising:
 obtaining a state of a driver of a vehicle when a mode for operating the vehicle is determined to be switched; and
 determining whether the state of the driver is sufficient for the driver to proceed with manual driving of the vehicle after vehicle recovery from automatic driving,
 wherein automatic driving cruising is prohibited in a case where the circuitry determines that the state of the driver is not sufficient to proceed with manual driving before the automatic driving cruising of the vehicle is started.

19. An automatic driving control device comprising:
a unit configured to obtain a state of a driver of a vehicle when a mode for operating the vehicle is determined to be switched; and
a recovery determination unit configured to determine whether the state of the driver is enough that the driver can proceed manual driving as recovery of automatic driving,
wherein automatic driving cruising is prohibited in a case where the recovery determination unit determines that the driver is not in enough state to proceed manual driving before the automatic driving cruising of the vehicle is started.

* * * * *